US005445696A

United States Patent [19]

Krawczyk

[11] Patent Number: 5,445,696

[45] Date of Patent: Aug. 29, 1995

[54] PACKAGING ARRANGEMENTS FOR ITEMS TO BE SUBSEQUENTLY MOUNTED

[76] Inventor: Margaret M. Krawczyk, 2380 N. Riverside Dr., Melbourne, Fla. 32903

[21] Appl. No.: 97,512

[22] Filed: Jul. 26, 1993

Related U.S. Application Data

[62] Division of Ser. No. 550,180, Jul. 9, 1990, Pat. No. 5,252,166.

[51] Int. Cl.$^6$ .................. B32B 31/00

[52] U.S. Cl. .................. 156/230; 156/63; 156/247; 52/384; 53/509

[58] Field of Search .................. 156/63, 71, 155, 230, 156/234, 240, 247, 297, 290, 292, 298; 53/238, 284.2, 284.3, 427, 509, 562; 428/38, 46, 47, 48, 49, 317.5, 542.6; 52/384, 385, 387; 434/74, 96

[56] References Cited

U.S. PATENT DOCUMENTS

| | | | |
|---|---|---|---|
| 2,931,751 | 4/1960 | Fresne | 428/49 |
| 4,561,232 | 12/1985 | Gladden, Jr. et al. | 52/385 |
| 4,889,572 | 12/1989 | Danico et al. | 156/63 |
| 4,963,407 | 10/1990 | Detweiler et al. | 156/63 X |

FOREIGN PATENT DOCUMENTS

| | | | |
|---|---|---|---|
| 288853 | 7/1935 | Italy | 156/63 |
| 23788 | 3/1978 | Japan | 53/427 |

*Primary Examiner*—James J. Engel

[57] ABSTRACT

A packaging arrangement for items to be subsequently mounted, having a pair of plastic sheets with dimensions that are greater than the item. One sheet includes an adhesive layer that adheres to the front face of the item and also adheres to portions of the other sheet so that the item is captured in between. The sheet with the adhesive layer is preferably transparent. When mounting, the sheets are separated, a mounting adhesive is applied to the back face of the item, and thereafter both the adhesive layer and the back face are urged against the mounting surface. The sheet temporarily maintains the item mounted until the mounting adhesive hardens and the sheet is thereafter removed. The item can a single unit, or a plurality of loose units, or a plurality of units attached to a backing. If a single unit or a plurality of pre-connected units, the packaging arrangement need not attach to the entire item. Guides in the form of lines or holes are provided as a means to aid in aligning the item in the mounting process. If a large design is to be created, the packaging arrangement can include a plurality of partial packaged items for mounting adjacent each other to create the composite design. In addition, the partial packaged items can be mounted on top of each other to create a three dimensional design.

40 Claims, 15 Drawing Sheets

PACKAGING ARRANGEMENTS FOR ITEMS TO BE SUBSEQUENTLY MOUNTED

This is a division of application Ser. No. 07/550,180, filed Jul. 9, 1990 now U.S. Pat. No. 5,252,166.

FIELD OF INVENTION

This invention pertains to packaging arrangements in general, and more particularly to packaging arrangements for items to be subsequently mounted and wherein the packaging arrangement also functions as an aid in the mounting process.

BACKGROUND OF THE INVENTION

Mosaic designs, that are formed of pieces of tile, glass, plastic, stone chips etc., are generally made by manually creating individual designs, by hand placing various pieces of tile etc., to achieve the desired artistic effect. Pieces of glass, or plastic, can be leaded together by securing the edges of the pieces together to form the design, such as disclosed in the U.S. Pat. No. 4,302,206 issued to J. Meltzer. If pieces of stone are used, the design can be made by encapsulating the entire unit by a molding process with the use of an epoxy type glue. Tile type designs are usually created by either cementing individual tile pieces directly on to the surface to which they are to be permanently adhered, or alternately, by securing the backs of tile pieces to a netting or screening type material as a carrier and then cementing the combination of the carrier and the tile unit permanently in place. A tile design is disclosed in the U.S. Pat. No. 400,467 issued to H. B. Allaeys, in which the individual tile pieces are cemented together as a unit with the cement placed between the various tile pieces as well as covering the backs of the tile pieces. For those units that are individually created by hand placing individual pieces to form the desired designs, such as in the above mentioned Allaeys reference, the procedure is time consuming, expensive, and requires a significant amount of artistic ability, and therefor is not readily adaptable to mass production techniques. The U.S. Pat. No. 4,889,572 issued to Danico et al discloses a mass production technique for making tile designs from precut pieces of tile by first making a master design pattern, then placing a transparent substrate such as plastic over the master pattern, and then permanently cementing the backs of like matching pieces of tile to the transparent substrate in a manner to match the master design pattern. Alternately, the U.S. Pat. No. 4,889,572 teaches a mass production technique of making tile designs by using precut pieces of tile that are individually placed in a mold to recreate a previously created master pattern. Thereafter, the front faces of the tile pieces are secured by a water soluble glue, or a detachable adhesive, to a temporary carrier. Later when the back side of the tile pieces are permanently mounted to a surface, the material attached to the front faces of the tile pieces is removed by water or otherwise. Both of the methods of the U.S. Pat. No. 4,889,572, are methods of producing mosaic designs that are, in part, applicable to the mass production of mosaic designs for the present invention.

With the tile designs that are secured to flexible substrates, either by the temporary carrier on the front faces as taught by the U.S. Pat. No. 4,889,572 or by a screening carrier secured to back sides as conventionally done, there is a need to be adequately secured so they can withstand a significant amount of rough handling that can be expected by workmen when transporting and mounting the tile design in place. Should a tile piece break loose from its carrier during such handling, the unit may become defective or useless. Hence it is important that such tile pieces, back or front faces, are adequately secured to the carrier to withstand rough handling.

In a case where the front faces of the tile pieces are temporarily secured to a carrier, the strength of the temporary adhesive bond is usually directly related to the subsequent difficulty of removing the carrier after the file pieces are subsequently permanently mounted. As mentioned above, the pieces of tile must be adequately secured to the carrier to withstand significant amounts of the expected rough handling. On the other hand, as the strength of the adhesive is increased, the difficulty of subsequently removing the carrier is also increased. In addition, once the carrier is removed, any adhesive residue left on the front faces is required to be removed without damage to the tile front faces. Further, when shipping or transporting such prior art tile designs, it is preferred to package such units in a manner to control the amount of flex and stress that may be applied to the designs to thereby reduce the possibility of pieces breaking loose. It would therefore by desirable to have a packaging arrangement by which the front faces mosaic designs, tile units, and the like, can be secured to a temporary carrier that could withstand a significant amount of rough handling, and yet still be easily separated from the tile units without leaving any noticeable amount of residue.

In mounting the mosaic designs or tile units of the prior art, whether the back faces are secured to the screening carrier in the conventional manner, or the front faces are secured to a temporary carrier, it is usually desired that such mosaic designs or tile units be mounted to fit within some overall desired positional relationship. Usually vertical and horizontal lines are provided on the mounting surface to serve as guides to aid in positioning items in place. The person mounting such units usually visually gages the items into place relative to these guide lines. When tile units are used to form entire walls or floors, the vertical and horizontal relationship must be maintained throughout, usually requiring a skilled workman to achieve the desired overall effect. It would therefor be desirable if a packaging arrangement could be provided for mosaic designs, tile units, and the like, that would include guides to aid the person installing the units to achieve the desired positional relationship, thereby reducing the skill required in such mounting process.

In addition to the two dimensional mosaic designs mentioned above, mosaic designs can be created in multiple layers to provide three dimensional designs. If the tile pieces used to create layers of the three dimensional design are colored or transparent or combination pieces, such mosaic designs, when lighted from behind, allow the colors of the overlapping pieces to blend and provide a blending of colors. Such three dimensional mosaic designs are particularly difficult to produce by individual manual procedures and are very time consuming and expensive. It would be desirable if a mass production technique could be provided to produce such three dimensional mosaic designs.

SUMMARY OF THE INVENTION

In accordance with the invention, a packaging arrangement captures an item, that is to be subsequently mounted, between the two substrates. At least the substrate selected as the front substrate has an adhesive layer formed on one surface thereof that adheres to, and is readily detachable from, the other substrate and the item in between without leaving a noticeable amount of residue on such item. The front of the item packaged, ie. that side which is to be visible after mounting, is secured to the front substrate adhesive layer. The portions of the two substrates that extend beyond the item and through voids in the item adhere to each other to maintain the item captured in between. The packaging arrangement can cover the entire item or parts thereof. If the packaged item is formed of a plurality of loose elements, the substrates completely captures all the elements. If the packaged item is a single solid unit, or a plurality of pieces secured to another substrate or carrier, the package substrates can capture the entire item, or parts thereof. Both the substrates, in any event, are to extend beyond the item in a manner so that both substrates of the package adhere to each other and cover substantially all of the portions of the adhesive layer of the front substrate that extends beyond the item.

The packaging arrangement, in addition to capturing the item, functions as an aid for the subsequent mounting of the item to a surface. The back side substrate is separated and a mounting adhesive is applied to the back side of the item. Thereafter the back side of the item and the adhesive layer on the front substrate are both urged against the mounting surface. The portions of the adhesive layer on the front substrate that extend beyond the item and between voids in the item function to hold the item in place against the mounting surface until the adhesive on the back side of the item solidifies. Thereafter the front substrate is merely stripped away leaving the item mounted in place.

In accordance with a further feature of the invention, the front substrate may be transparent so that the item captured by the packaging arrangement is readily visible therethrough. Hence, the packaging means allows the item to be viewed prior to, and during, the mounting process.

In accordance with a further feature of the invention, guide means can be provided for the packaging arrangement that can include straight edges or reference holes, and the like, which can be used as aids for mounting the item relative to selected corresponding references. Preferably such guides are included on the portions of the package that extend beyond the captured item. The guides could also be made of stiff material that can function as a handle for the packing arrangement.

In accordance to a further feature of the invention, the item can be divided into several separate package arrangements. The guides on the separate package arrangements can function to aid in the mounting of the divided portions of the items in their proper inter-positional relationship.

In accordance with a method for producing such packaging arrangement, the item to be captured is placed so that its front face, ie. the side to be visible after permanent mounting, is placed on the adhesive layer of the front substrate. The back substrate is then placed over the opposite side of the item in a manner that extends beyond the item, so that the back substrate urges against and adheres to the unadhered portions of the adhesive layer of the front substrate, thereby capturing the item between the two substrates. If the captured item is not composed of a number of loose parts, the packaging arrangement may only cover portions of the item, but should extend beyond selected portions of the item to complete the package.

In accordance with a method for mounting such packaged item, the back substrate is stripped away so as to expose portions of the adhesive layer of the front substrate and the back side of item. Thereafter, a mounting adhesive is applied to the item. Then both the item, and the adhesive layer of the portions of the front side substrate that extend beyond the item, are urged against the mounting surface so that the adhesive layer maintains the item and front side substrate in place while the mounting adhesive hardens. Thereafter the front substrate is stripped away leaving the item mounted in place.

The guides on the packaging arrangement can function, prior to and during the application of the mounting adhesive, as a mounting aid to align the item relative to a reference. If the final design is composed of a plurality of separate packaged items, the guides can function as mounting aids to align the plurality of packaged items in the desired positional interrelationship.

If a three dimensional design is to be created, plural packaging arrangements with their captured items could be mounted on each other, in layers. Furthermore, the guides in the packaging arrangements can provide for the desired multi layer alignment.

DETAILED DESCRIPTION OF THE INVENTION

The invention shall be initially described in conjunction with a packaging arrangement for a mosaic design composed of a plurality of individual loose elements, such as, but not limited to, pieces of tile, plastic, glass, stone etc., that are positioned adjacent each other, but not secured together, to form a desired design. However it is to be understood that the invention will also apply to a packaging arrangement for any combination of interrelated parts, loose or secured together, as well as to solitary items.

Figure 4:
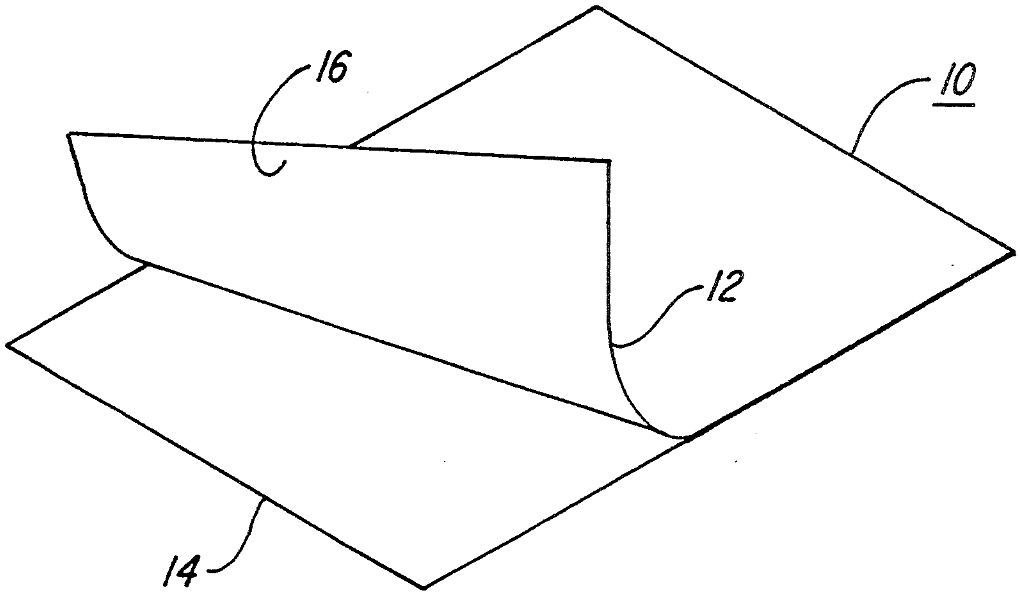
FIG. 4 illustrates the two plastic sheets, at least one of which is transparent, used in the packaging arrangement to capture the tile design and guides of FIG. 3, which sheets are illustrated partially separated to expose an adhesive layer on the inner side of at least the front sheet.

The packaging arrangement is comprised of a packaging material 10 including two thin flexible plastic sheets or substrates 12 and 14 as illustrated in FIG. 4. The first or front sheet 12 is preferably clear plastic, while the second or back sheet 14 can be opaque or clear. The front sheet 12 includes an adhesive layer 16 formed on the surface that abuts against the back sheet 14. The adhesive layer 16 is of the type that forms a strong bond with the front sheet 12 and has a sticky type adhesive quality on its exterior surface. The adhesive layer 16 is such that it is readily adaptable to adhere to the back sheet, or other items, and can thereafter be subsequently readily detached from the back sheet or items without breaking the strong bond between the adhesive layer 16 and the front sheet 12, and without leaving any noticeable residue on the back sheet or items to which it was temporarily adhered to. The adhesive layer 16 also has a quality by which items can be secured thereto and removed therefrom a reasonable number of times without seriously impairing its adhesive characteristics. This type of packaging material is available in commercial quantities as vinyl decal provided by companies as Minnesota Mining and Manufacturing (3M) having thickness in the order of 3 mn in sheets of various sizes, with the two sheets 12 and 14 secured together by the adhesive layer 16. Although the packaging material 10 has been described as having one sheet that includes an adhesive layer, a packaging material in which both sheets have an adhesive layer could also be used, however the adhesive strength on the front sheet 12 is to be significantly stronger that on back sheet 14. Hence as can be seen the packaging material 10 has the characteristic wherein the two sheets 12 and 14 can be readily separated and an item positioned on the adhesive layer 16 and the sheets 12 and 14 can thereafter be readily reengaged to capture the item inbetween. The two sheets 12 and 14 are also thereafter readily separable, so that the captured item can be subsequently removed by pulling the item away from the adhesive layer 16.

For the purpose of describing the invention herein, the combination of the two sheets 12 and 14, as described above, shall be called the package 10. When the package 10 is used to capture a mosaic design, the design can be initially created by placing loose pieces adjacent each other in the desired form on a surface. The surface is preferably made of a relatively cohesive material, such as, wood, plastic, glass etc., so that the surface can adhere to the adhesive layer 16 but will not separate apart when the front sheet 12 is later removed. Once the mosaic design is completed and the individual pieces are loosely positioned in their desired positional interrelationships, the package 10, having a size greater than the mosaic design, is used to capture the loose mosaic design by the portions of the package 10 extending beyond the mosaic design.

Figure 1:
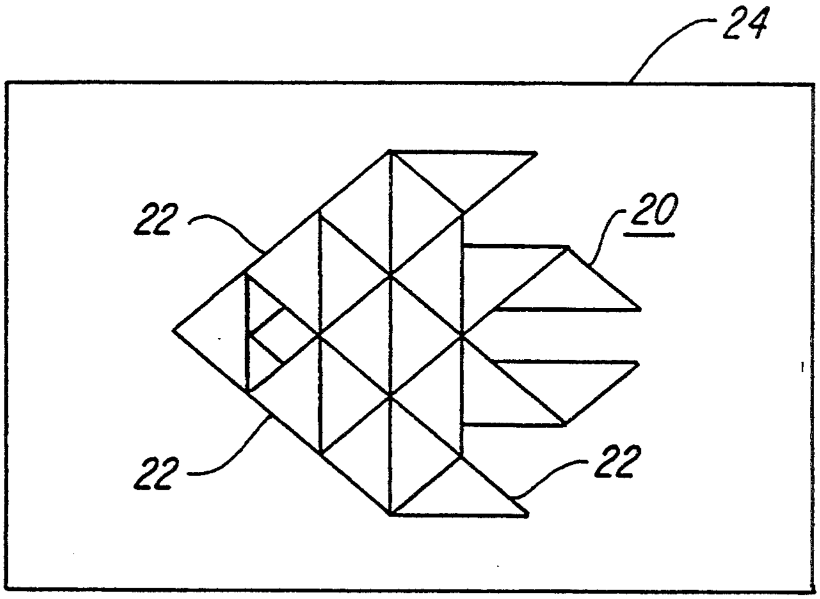
FIG. 1 illustrates an example of a mosaic design, comprised of pieces of tile permanently secured to a substrate, to function as a pattern for the mass production of other tile units.

FIG. 1 illustrates a mosaic design 20 of a fish made from twenty tile pieces 22. The individual tile pieces 22 are selected from various commercially available tile squares. Such commercially available tile squares include a plurality of ceramic tile pieces, of various colors and sizes, the back sides of which are adhesively secured to a screening type carrier. Such tile squares in their conventional use are usually cemented in place as a whole (including the carrier) to form a part of a wall, floor, etc., covering. The packaging arrangement for tile squares, in accordance with the present invention, is described in a later portion of the specifications with regard to FIGS. 14–16.

Figure 2:
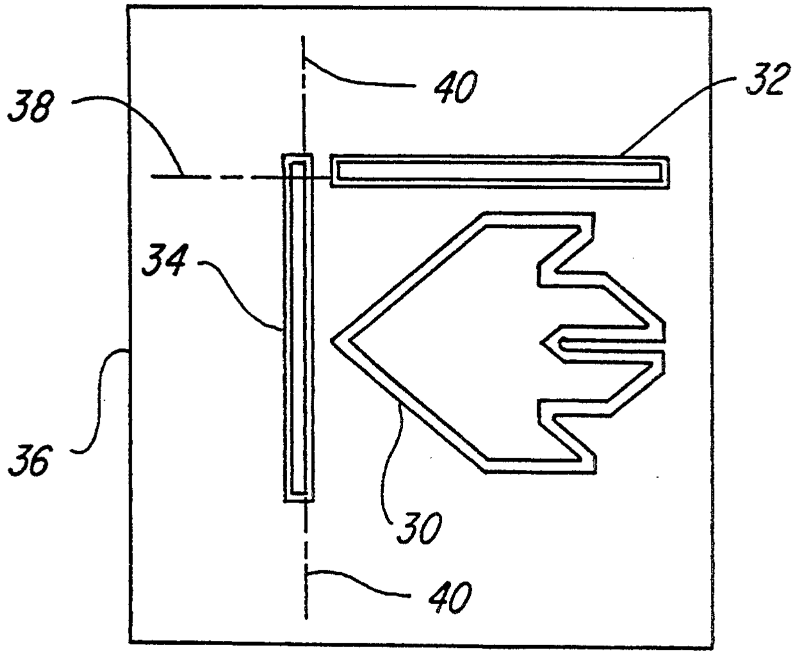
FIG. 2 illustrates a clear plastic panel with outline frames for use in mass producing mosaic designs from the pattern of FIG. 1 and includes mounting guides.

The tile pieces 22 for the mosaic design of FIG. 1 are selected from such commercially available tile squares in accordance with their color, shape and size. The selected tile pieces are removed from the carrier and are set aside and used to create the mosaic design 20. In accordance with one method of mass producing the mosaic design 20, the tile pieces 22 are cemented to a surface 24 of FIG. 1 to function as a master pattern. Thereafter identical tile pieces can be subsequently loosely placed on the pattern, front face up, to recreate the design and then can be packaged in accordance with the invention. As a further aid to mass producing the mosaic designs, FIG. 2 illustrates three molds or frames 30, 32 and 34 mounted on a transparent or translucent substrate 36. The mold 30 has the outside of the outline of the fish of the mosaic design 20 of FIG. 1.

Molds 32 and 34 have a straight line design and are positioned along the X and Y axes 38 and 40 relative to the mold 30. The molds 30–34 can for example be made of strips of metal or plastic that are cemented to the substrate 36 and preferably have a height that is slightly less than the thickness of the tile pieces in the case of the mold 30, and the guides in the case of molds 32 and 34. The molds 30–34 are used in the mass production of the mosaic designs by placing the substrate 36 over the design pattern 20 of FIG. 1 so that the mold 30 follows the contour of the design pattern 20. Pegs can be provided to aid in aligning the molds with the master pattern. As an alternative to the separate master pattern of FIG. 1, the tile design 20 could be cemented to the backside of the clear substrate 36, face up, wherein the combination would function as both the master pattern and the mold. As a further alternative, the molds 30–34 could be built on the surface 24 surrounding the master pattern 20, with the height of the mold 30 being slightly less than twice a tile thickness, and the height of the molds 32 and 34 twice that of the guides to be inserted therein so that the mosaic design can be created right on the master pattern itself, thereby eliminating the need for a clear substrate.

Figure 3:
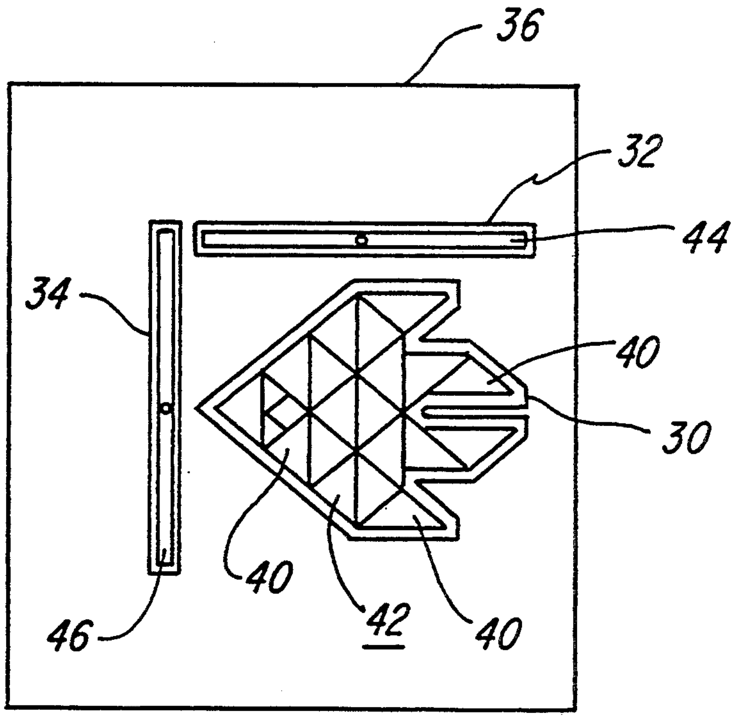
FIG. 3 illustrates the plastic panel and frames of FIG. 2 with pieces of tile and guides inserted therein.

By using any of the various mold concepts described above, twenty tile pieces 40, corresponding in shape to the tile pieces 22 of the pattern 20, are loosely placed within the mold 30 to form the mosaic design 42 from the pattern 20 as illustrated in FIG. 3. Similarly the guides 44 and 46 are loosely placed within the molds 32 and 34.

Figure 5:
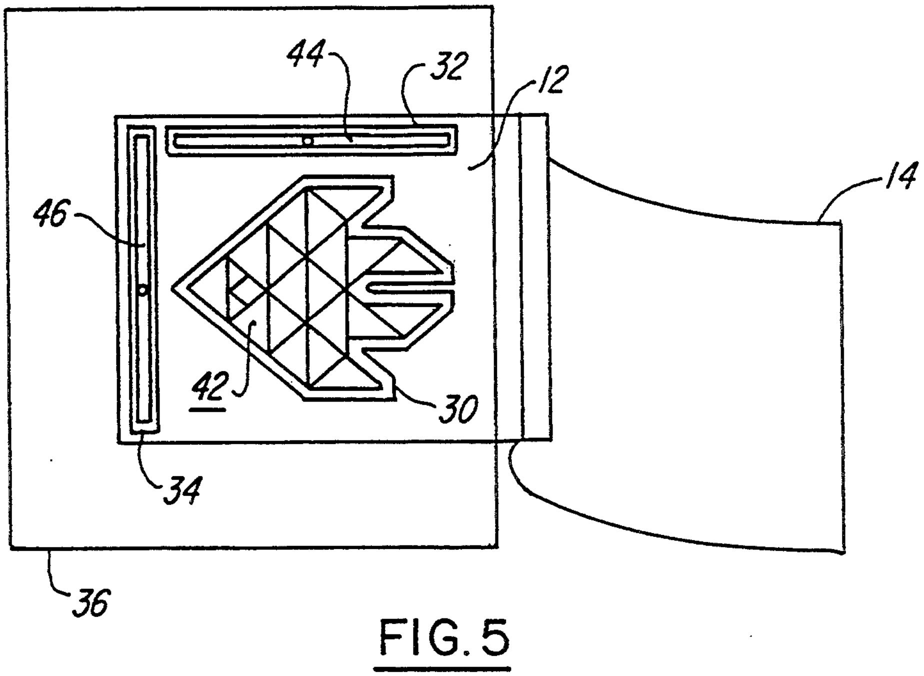
FIG. 5 illustrates the tile design and guides of FIG. 3 covered by the front sheet of FIG. 4 with the adhesive layer facing the tile design, guides and panel.

At this time, the two sheets 12 and 14 of the package 10 are separated partially, or entirely. The partial separation of the sheets 12 and 14 has the advantage of maintaining the sheets in registry. As illustrated in FIG. 5, the front sheet 12, with the adhesive layer 16 facing down, is placed over the tile design 42 and mold 30, 33–34, and guides 44 and 46 in a manner so that the tile design, guides and molds are slid between the partially separated sheets 12 and 14. The front sheet 12 is then urged against the mosaic design 42 and the guides 44 and 46. If the mosaic design 42 is recreated without the use of the molds, ie., by merely loosely placing like pieces of tile on the master pattern 20 of FIG. 2 as mentioned above, added care must be used when urging the sheet 12 against loose pieces so as not to change the relative positions of the various tile pieces. In such case, the use of double sided tape to temporarily hold the tiles in place on the pattern is suggested. The front sheet 12 and back sheet 14 are selected to be of a size so as to extend beyond the mosaic design 42 and the guides 44 and 46. In the case of relatively thin tile mosaic designs 42 and guides 44 and 46 made of plastic or cardboard, the size of the sheets 12 and 14 is such as to extend beyond the mosaic design 42 and the guides 44 and 46 by at least an inch. In the process of securing the top sheet 12 to the mosaic design 42 and the guides 44 and 46, the portions of the top sheet 12 extending beyond and in between the mosaic design 42 and the guides 44 and 46 will probably also temporarily adhere to the surface of the substrate 36. It is therefore important that the amount of dirt or dust on the surface of the substrate 36 is minimized so as to reduce the amount of such dirt or dust that may adhere to the adhesive layer 16.

Figure 6:
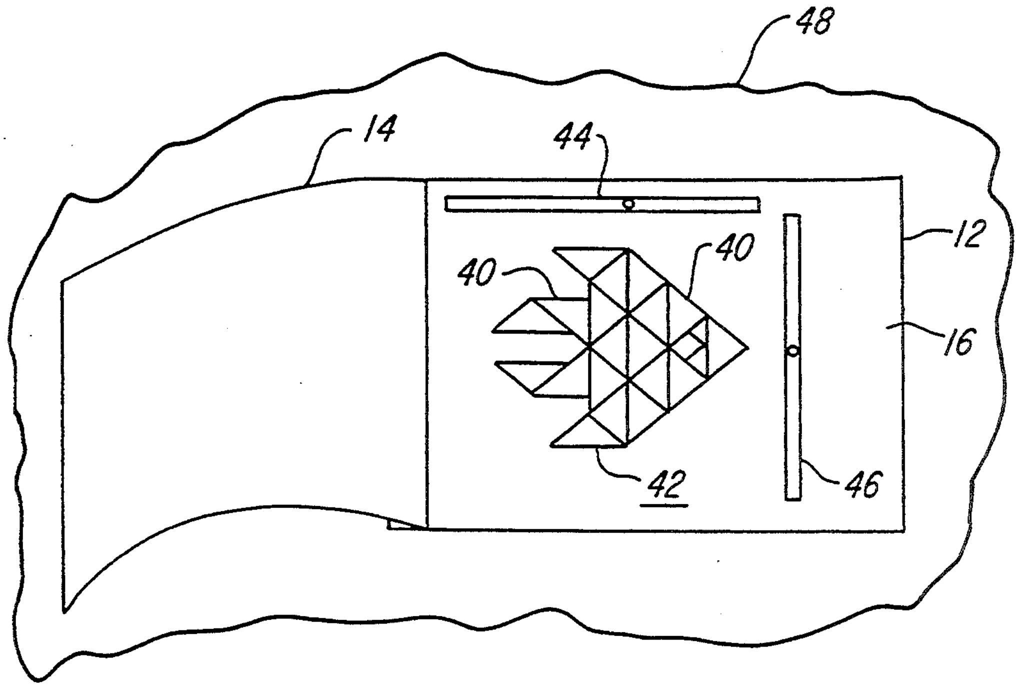
FIG. 6 illustrates the tile design and guides adhering to the front sheet of FIG. 5, removed from the frames and panel, and flipped over to expose the back sides of the tile pieces and guides, as well as unattached portions of the adhesive layer of the front sheet.

Thereafter, the top sheet 12 is removed from the substrate 36 taking with it the loose tile pieces of the mosaic design 42 and the loose guides 44 and 46. As illustrated in FIG. 6, the partially detached back sheet 14 and the top sheet 12 with the adhering mosaic design 42 and the guides 44 and 46 are flipped over and placed on a working surface with the adhesive layer 16 extending away from the working surface and the backs of the mosaic design 42 and the guides 44 and 46 exposed. Should any tile piece 40 of the mosaic design 42 or the guides 44 and 46 fail to adhere to the adhesive layer 16, such piece or pieces of tile 40 or the guides 44 and 46 can now be put in place by urging its front face against the space left blank, or by repeating the process.

Figure 7:
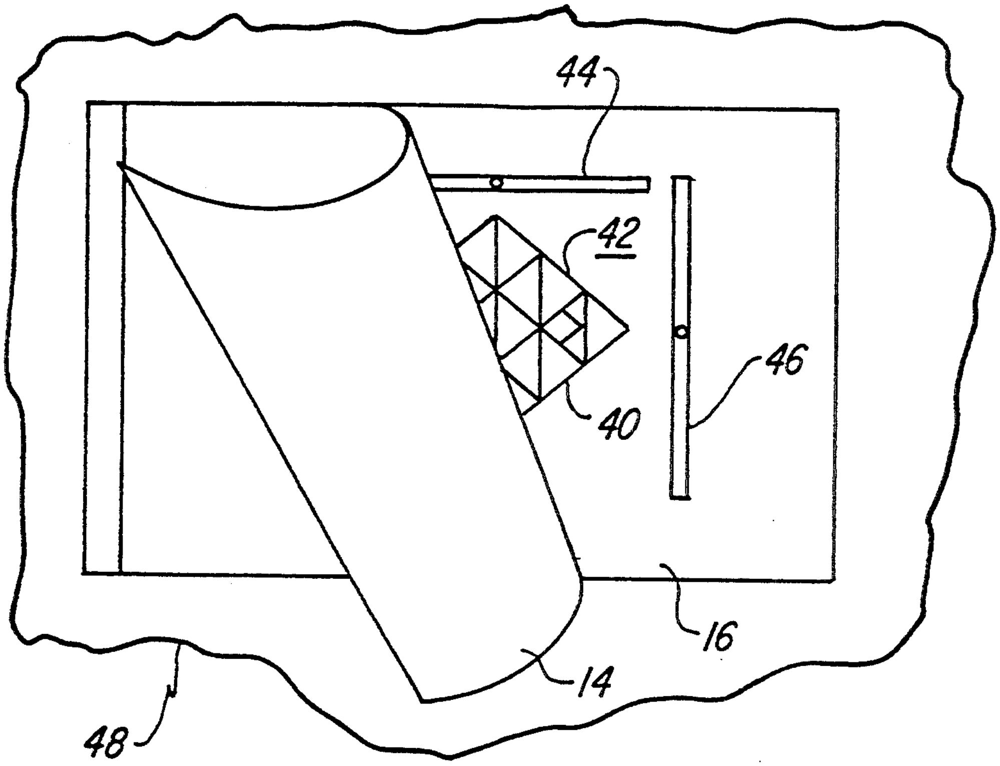
FIG. 7 illustrates the tile design and guides of FIG. 6, with the back sheet being reapplied, so as to cover the back sides of the tile pieces and the guides and to adhere to the otherwise unattached portions of the adhesive layer of the front sheet, to complete the packaging arrangement.
Figure 8:
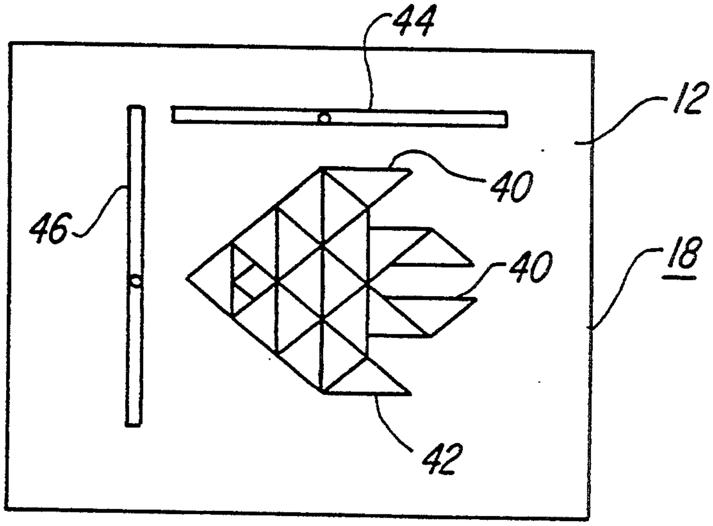
FIG. 8 illustrates the completed package arrangement capturing the tile design and guides with the tile design and guides visible through the front sheet.

As illustrated in FIG. 7, the back sheet 14 of the package 10 is now pivoted back and urged against the top sheet 12 and the mosaic design 42 and guides 44 and 46 (or placed back over the sheet 12 if entirely removed). Care should be taken to minimize any wrinkles or folds in the back sheet 14 when the back sheet is urged against the portions of the adhesive layer 16 that extend beyond and in between the mosaic design 42 and the guides 44 and 46. Hence the back sheet 14 adheres to the sheet 12 to thereby securely capture the mosaic design 42 and guides 44 and 46 with the front sheet 12. The completed packaging arrangement 18 is illustrated in FIG. 8. It should be noted that the mosaic design 42, which was once a number of independent tile pieces 40 that were loosely positioned adjacent each other, are now captured and maintained in this design configuration by the package 10. Further, the pair of guides 44 and 46 are also captured by the package 10 in their predetermined positional relationship with regard to the mosaic design 42. The tile design 42 is held securely captured by the package 10 by not only adhering the tile pieces 40 to the front sheet 12, but also by the envelope formed by the adhering portions of the sheets 12 and 14 that extend beyond and between the tile design 42 and the guides 44 and 46 and adhere to each other. This packaging arrangement 18 is such that the unit comprising of the package 10 and the mosaic design 42 and the guides 44 and 46 can be roughly handled, thrown, shaken, crumbled, rolled, etc., without destroying the packaging arrangement 18 or changing the interpositional relation of the various elements of the mosaic design 42 and the guides 44 and 46. By covering the entire adhesive layer 16 of the front sheet 12 with the back sheet 14, the amount of dirt, dust, or other particles that can adhere to the adhesive layer is minimized thereby maintaining the strength of the adhesive layer as well as preserving the aesthetic quality of the packaging arrangement. No further packaging in the form of cardboard stiffeners etc., is needed for the packaging arrangement 18 to withstand the normal expected amount of handling. For example, if the packaging arrangement, including the combination of the package 10, the mosaic design 42 and guides 44 and 46, is to be mailed, it can be merely placed in a usual manila mailing envelope of appropriate size and so mailed, without any additional protective material.

As previously mentioned above, it was stated that it would be preferable if that at least the front sheet 12 would be clear, such as the above mentioned material provided by Minnesota Mining and Manufacturing Company (3M). This is because the front faces of the mosaic design 42 and the guides 44 and 46 can readily be visible through the sheet 12 so that a purchaser can easily view the particular mosaic design to be sold rather than a model or a photograph. This is advantageous since tile pieces used to create a particular mosaic design may change somewhat, from unit to unit, in color or shape. Further since the back sheet 14 covers the entire front sheet 12, the packaging arrangement includes an envelope that is sealed by the two sheets, minimizing the possibility that dust or other particles would adhere to the adhesive layer 16, which would otherwise detract from the attractiveness of the packaging arrangement, as well as its adhesive qualities. The clear front sheet 12 has the further advantage in that the mosaic design 42 and guides 44 and 46 can be viewed prior to mounting by holding the packaged unit up against the surface on which the mosaic design 42 is to be mounted and by moving the unit around to best determine, where, and in what relative orientation, the mosaic design 42 is to be mounted. It would also be desirable if both sheets 12 and 14 of the package 10 were clear so that if the packing arrangement 18 is placed against the surface to which the mosaic design 42 is to be mounted, the surface and the mosaic design 42 can both be viewed for mounting purposes relatively unobstructed.

In accordance with a modification of the method of manufacturing the packaging arrangements 18 of the invention, the mosaic design can be produced by placing a transparent back sheet 14 over the master design pattern 20 and the new mosaic design 42 and guides 44 and 46 recreated thereon by placing the guides and matching pieces of the tile face up on the back sheet 14. The front sheet 12 can now be reapplied with the adhesive layer 16 face down on both the front faces of the pieces of tile 40 and the guides 44 and 46 and the back sheet 14. In such an arrangement the back sheet 14 functions both as the clear substrate 36 of FIG. 3 as well as the back sheet 14 of the package 10. In a further alternative method, the outline of the mosaic design and guides can be drawn or printed on the back sheet 14 of clear or opaque form, and the mosaic design and guides created directly on such back sheet 14, and the front sheet 12 thereafter applied thereto as mentioned above. If a mold of a foam type material is used, as disclosed in the Danico et al reference, some sort of sealer will be required to seal the foam material to provide a solid surface that will not break away from the mold when sheet 12 is removed.

To aid in handling of the packaging arrangement 18 a stiffener portion can be secured to the packaging arrangement. The stiffener portion may be for example, a strip of stiff cardboard or a piece of wood. The stiffener portion may be secured directly to the front sheet 12 by removing a portion of the back sheet 14 and securing the stiffener directly to the adhesive layer 16. If further support is desired the stiffener can for example be stapled to the front sheet 12. Further, as illustrated in FIG. 3, the guides 44 and 46 can be made of stiff material and provide a handle as well as the reference means by which the design can be properly positioned for mounting.

Figure 13:
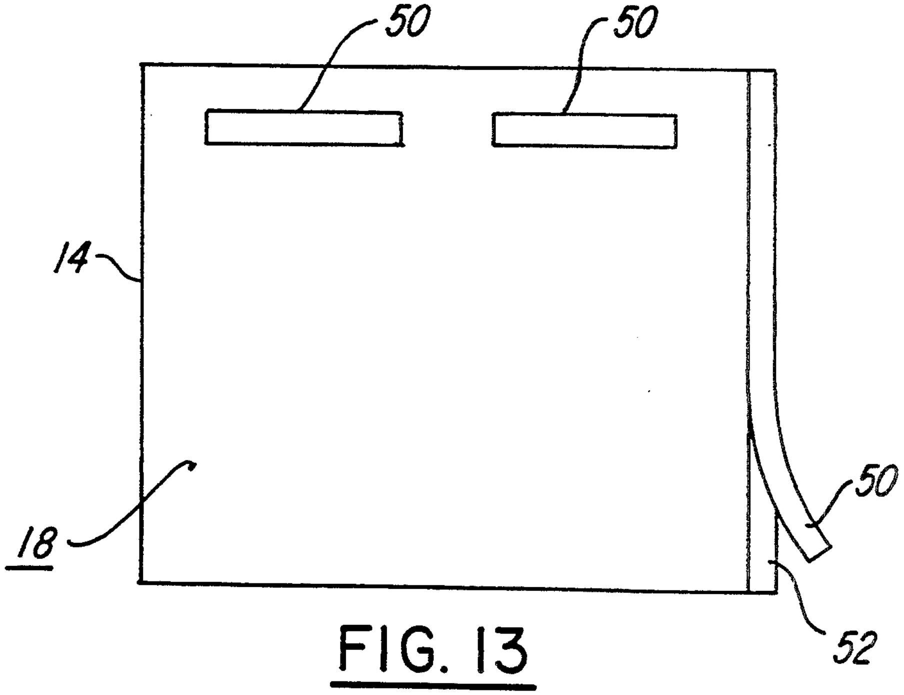
FIG. 13 illustrates the backside of the back sheet of the packaging arrangement modified with temporary mounting tabs, with part of one of the tabs being partially removed.

As illustrated in FIG. 13, the back sheet 14 of the package 10 may also have one or more readily removable tab portions 50, located preferably adjacent to the guides 44 and 46. The tab portions 50 are previously cut or partially cut from the back sheet 14. When the back sheet 14 is assembled into the packaging arrangement 18 as described above, the tab portions 50 are replaced in the empty portions of the sheet 14 to adhere to and cover the exposed portion of the adhesive layer 16 of sheet 12. During the tile design mounting process, the tabs 50 can be removed to expose the underlying portions of the adhesive layer 16 so that the portions of exposed adhesive layer 16 can be used as the temporary mounting means.

Figure 10:
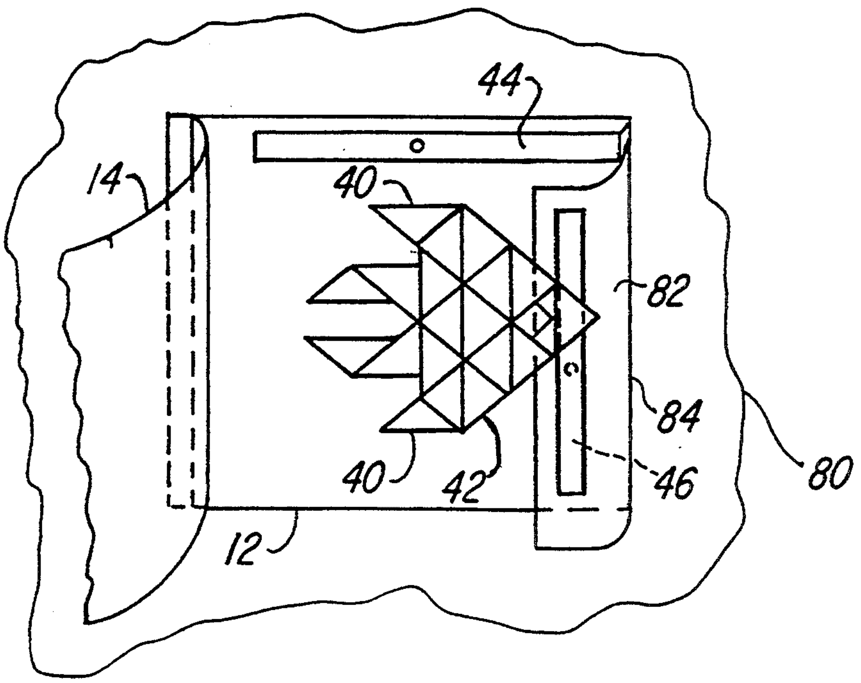
FIG. 10 illustrates the second step for mounting the tile design by pivoting the portion of packaging arrangement about the portion of the front sheet previously adhered to the mounting surface and further stripping away the back sheet to expose the backs of the tile pieces for applying mounting adhesive thereto.
Figure 11:
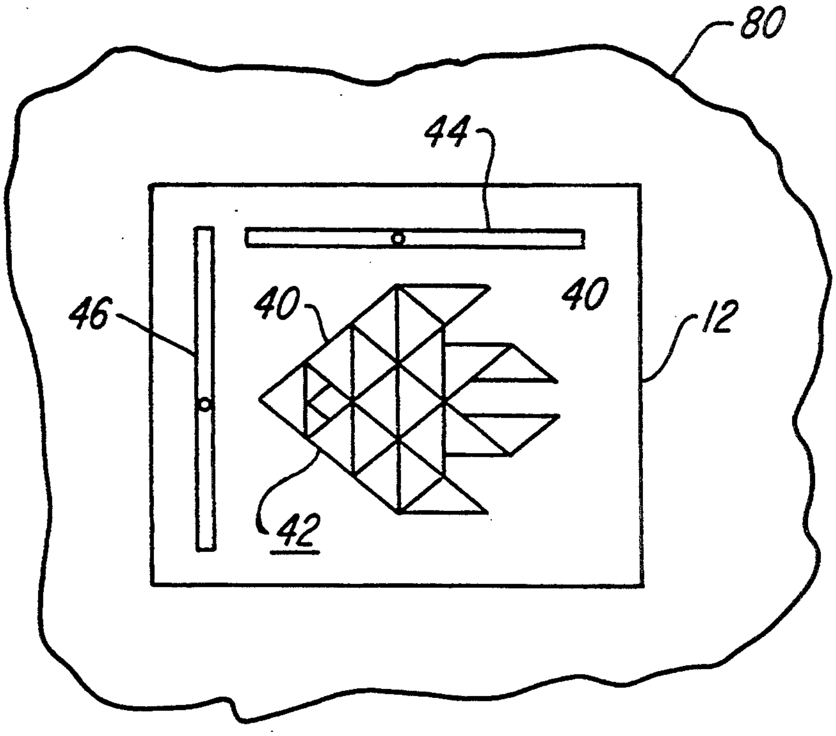
FIG. 11 illustrates the third step for mounting the tile design by removing the back sheet and urging the backs of the tile pieces with the mounting adhesive applied thereto against the substrate while simultaneously urging the exposed portions of the adhesive layer of the front sheet against the surface for temporarily holding the tile design in place while the adhesive on the tile pieces hardens.
Figure 12:
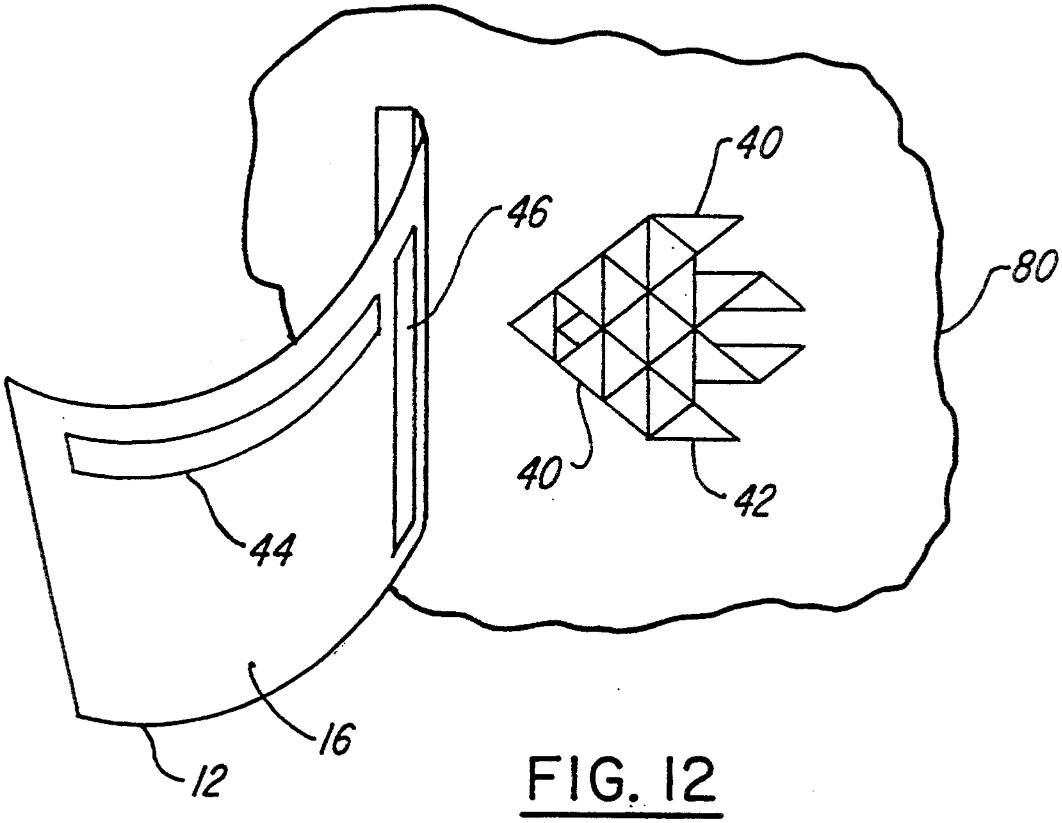
FIG. 12 illustrates the fourth step for mounting the tile design by removing the front sheet and guides.

The packaging arrangement 18 for the mosaic design 42, described above, in addition to providing the means for capturing the mosaic design, also has the added capability of functioning as an aid in the process of mounting mosaic design 42 permanently to a surface 80, as illustrated in the mounting steps of FIGS. 10–12. The mounting surface 80 for example, can be any wall, door, window, mirror, and the like. In addition, since the ceramic mosaic design 42 may be composed of material that will withstand water, the mosaic design can be mounted in swimming pools, on hot tubs and spas, showers, tubs, etc. The method of mounting the mosaic design 42 will depend upon the surface 80 and the manner by which the mosaic design 42 is to be cemented to the surface 80, ie., whether the design will extend from the surface or whether the design is to be cemented to be flush to the surface.

When mounting the mosaic design 42 in accordance with the invention, the guides 44 and 46 are oriented relative to the references 88 and 90, the back sheet 14 is partially peeled away and a portion of the adhesive layer 16 is attached to the surface 80. As illustrated in FIG. 10, the packaging arrangement 12 is then pivoted around the edge 84 of the portion of the front sheet 12 adhering to the surface 80. The back sheet 14 is then further peeled away so as to expose the back sides of the tile 40, but still being attachable to sheet 12 in part. A mounting adhesive is now applied only to the back sides of the tiles 40. As illustrated in FIG. 11, the front sheet 12, is then pivoted back around the edge 84 and the back sides of the tile 40 and the adhesive layer 16 of the front sheet 12 are urged against the mounting surface 80. The portions of the front sheet 12 that extend beyond and in between the mosaic designs and guides maintain the mosaic design 42 in place while the tile mounting adhesive hardens. Thereafter, as illustrated in FIG. 12, the front sheet 12 is peeled away from the surface 80 along with the guides 44 and 46 while the mosaic design 42 remains in place. Should any tile 40 fail to be permanently glued, it can thereafter be glued in place by hand. Since no adhesive has been placed on the guides 44 and 46, they are removed with sheet 12. Essentially no residue will be left on this front face of the tile pieces 40 or the mounting surface 80, therefor requiring no, or very little clean up.

When the mosaic design 42 is to be mounted, care should be taken in controlling the amount of mounting adhesive that is placed on the backs of the tile pieces 40 so that when the mosaic design 42 is urged against the mounting surface and the adhesive squashed in between, the amount of adhesive that extends beyond the pieces is minimized. To further reduce the visual effect of the adhesive that may extend beyond the tile pieces, the use of a clear adhesive can be used.

Figure 9:
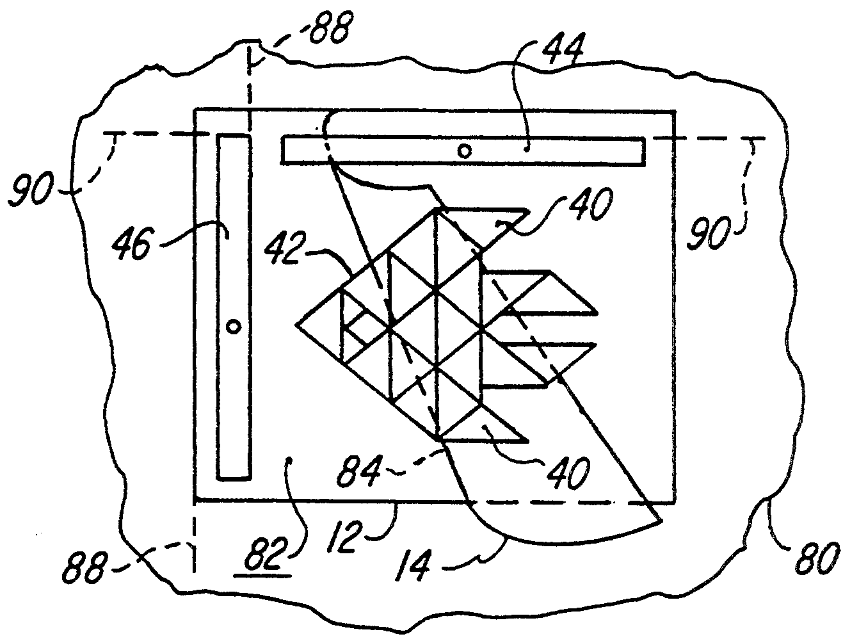
FIG. 9 illustrates the first step for mounting the tile design by positioning the guides relative to references and by stripping away a part of the back sheet to expose a part of the adhesive layer on the front sheet and urging such portion of the adhesive layer to adhere to the mounting surface.

As previously mentioned straight edges of guides 44 and 46 are positioned along the guide line 88 and 90 of FIG. 9, or used in conjunction with a level to help assure that the mosaic designs, when mounted, will have the desired positional configuration.

Further, as previously mentioned above with regard to FIG. 13, the back sheet 14 of the package 18 can include one or more removable tabs 50. The purpose for the tabs 50 is to provide a temporary means for positioning the packaged mosaic design 42 so that the party mounting the design can best select a preferred location. For example the party mounting the design 42 can place the packaging arrangement along the mounting surface, remove a tab 50 and temporarily secure the packaging arrangement to the surface with exposed tab portion 52 of the adhesive layer 16, while thereafter being able to step away from the temporarily mounted unit and view it from a distance. If the location is not satisfactory the adhesive tab portions 52 of the package unit 10 can be simply disengaged and temporarily secured to a new location until a desired location is selected.

Once a permanent location has been found for the mosaic design 42, the preferred method of mounting the mosaic design is to first draw the reference lines 88 and 90 of FIG. 9 vertical and/or horizontal, to which a straight edge on a guide 42 or 44 or both can be aligned. With the straight edge of the guides so aligned, the tabs 50 are removed and the packaged unit temporarily secured to the surface for a final view prior to permanent mounting. If satisfactory, an added portion of the back sheet 14 adjacent to the tabs 50 is peeled back and the greater portion exposed adhesive layer 16 is urged against the surface 80 to provide a stronger temporary mount. The process will thereafter continue as mentioned above with regard to FIGS. 9–12. Alternatively, if the mosaic design 42 is large, instead of applying adhesive to the entire mosaic design at one time as described above, the process can be completed in several steps. For example, once the packaging arrangement is temporarily mounted as described above, the back sheet 14 can be peeled away partially, and the mounting adhesive can be applied to the portion of the tiles 40 mosaic design 42 so exposed. These tile pieces 40 with the mounting adhesive therein are urged against the surface 80 and maintained in place by the adhesive layer 16 of part of the front sheet 12. The process is repeated a number of times until the entire mosaic design 42 is mounted to the surface and the entire front sheet 12 is adhered to the surface. Again, as mentioned above, once the tile mounting adhesive is hardened, the front sheet 12 is merely peeled away while the mosaic design 42 remains in place.

Commercially available tile units have the back sides of the tile pieces secured to a screen type carrier. Such tile units often have a square configuration so that they can be mounted side by side vertically and horizontally. However it should be understood that the tile units can also have a rectangular, triangular shape, or other shapes having generally equal matching sides. When such tile units of the prior art are used to cover a surface, lines are usually drawn on the surface to provide references to which the units are to be mounted for proper orientation. In the case of square or rectangular tile units, the reference lines can be horizontal and vertical. If triangular or other shapes are to be used, appropriate reference lines are provided with the proper angular configuration. In the conventional mounting method, cement or grout is spread over the mounting surface and the tile units are set in place by visually judging the position of the tile units relative to the reference lines, or with reference to the previously set tile units. Care is needed to assure that all tile units maintain their proper orientation and their desired equal inter-tile unit spacing. Once the entire surface is initially set with tile units, grout or cement is covered over all the tile units to fill between the spaces and the excess is cleaned off. Hence such tile units are usually set in place by professionals due to the need for maintaining such desired orientation and spacing requirements.

The packaging arrangement of the invention has the added advantage of providing guide means for simplifying the setting of such prior art tile units with the desired orientation and spacing, not only aiding "do it yourself" amateurs in accomplishing the task, but also simplifying the procedure for the professional. Although the packaging arrangement can be used with such prior art tile units the packaging arrangement can also be used with a tile unit composed of loose tile parts, captured in place by the packaging arrangement in the same configuration as that of the prior art unit, but however without the screening backing.

Figure 14:
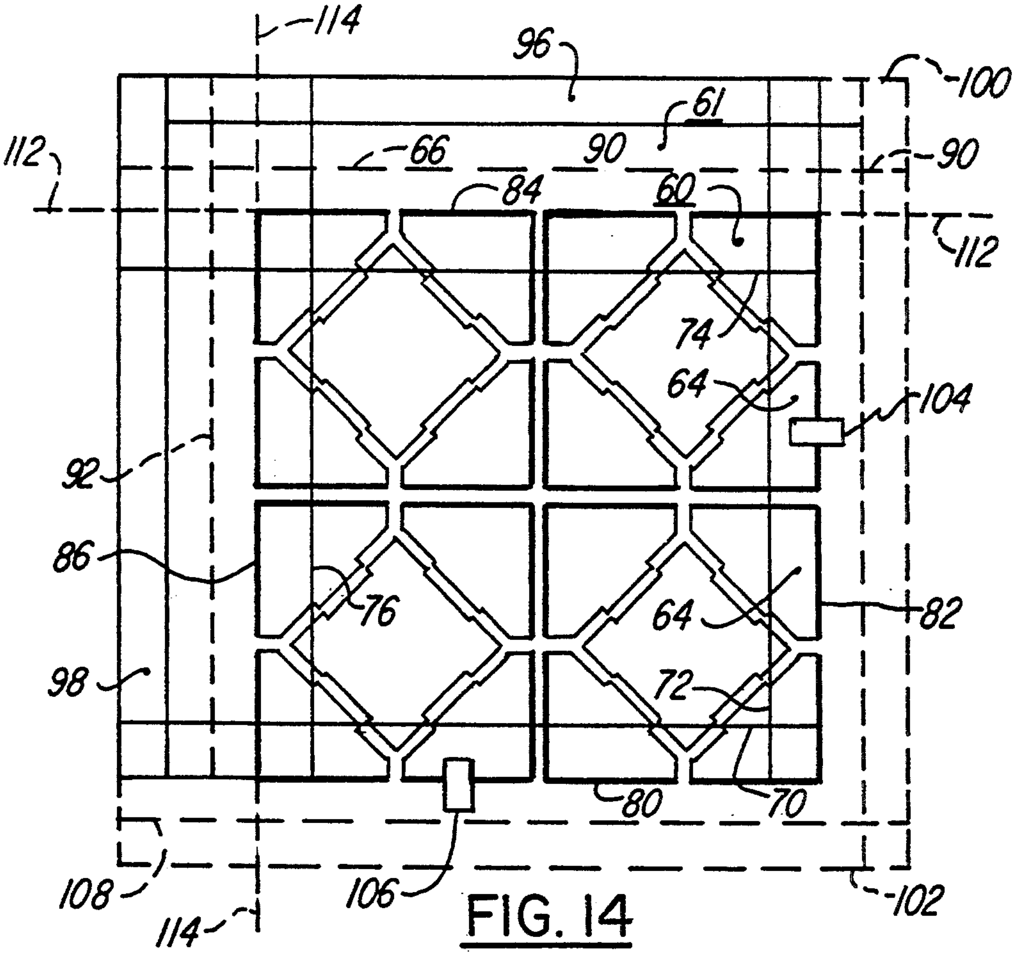
FIG. 14 illustrates square tile design captured by the packaging arrangement of the invention.
Figure 15:
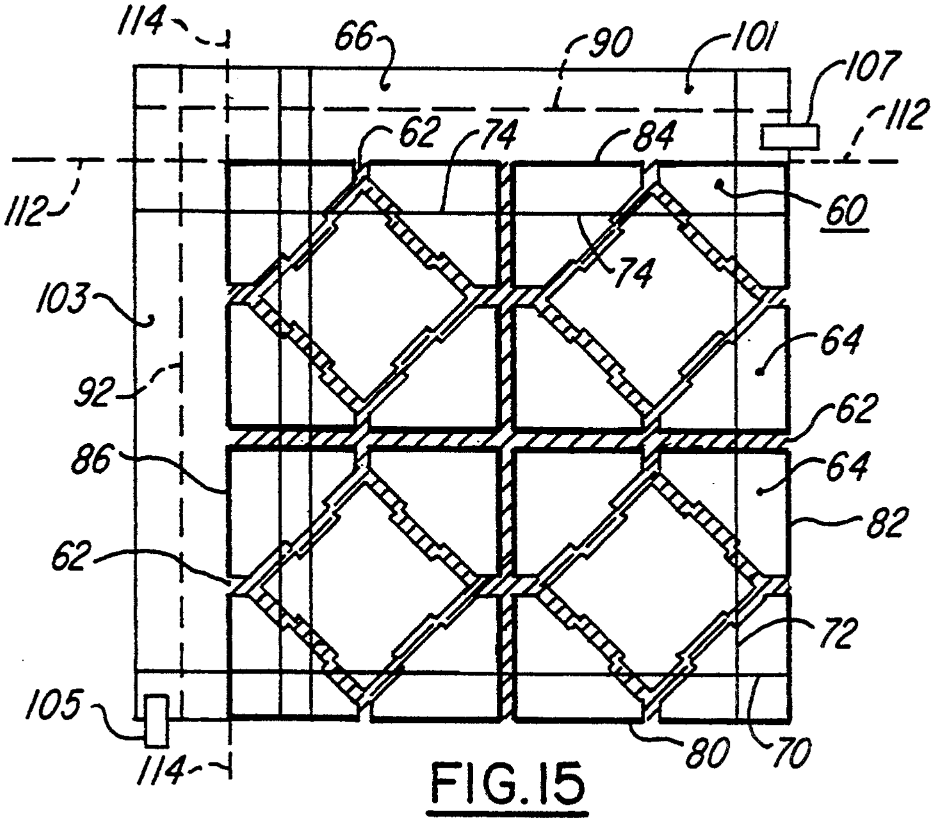
FIG. 15 illustrates a commercially available square tile with the back sides of the tile pieces secured to a carrier captured by a modified version of the packaging arrangement that covers less than the entire tile design.

As illustrated FIGS. 14 and 15, and the tile unit 60, for the purposes of describing the invention, has a square shape and can be either a prior art tile unit (with a screening base of FIG. 15) or a tile unit composed of loose tile pieces (of FIG. 14) 64 held together by the package as described above. If the tile unit 60 is the prior art unit of FIG. 15 the screening 62 extends over the backs of the tile and between the inter-tile spacing. If the tile unit 60 is composed of loose pieces held together by the package of FIG. 14 the inter-tile spacing are empty. the tile unit 60 of FIG. 14 is sandwiched by the package 61 between a pair of plastic sheets of the type described with regard to FIG. 4, wherein the front sheet 66 includes the adhesive layer. The packaged tile unit of FIG. 14 can be produced by the methods previously described with regard to FIG. 1–8. As further illustrated, packaging arrangement includes four of "on tile guide lines 70, 72, 74 and 76 located on the front sheet 61, each extending over the face of the tile unit 60 in parallel with separate tile unit edges 80, 82, 84 and 86, respectively, and equally spaced from the edges of the tile unit 60, and extending beyond the tile unit 60 to the edge of the sheet 66. In addition, the package 61 also includes two "off" tile guide lines 90 and 92 located on the front sheet 66 on the portion of the package 61 extending beyond the tile unit 60. The off guide lines 90 and 92 are parallel to edges 84 and 86 respectively of the tile unit 60 and equally spaced from the edges of the tile unit 60. The spacing between the off tile guide lines 90 and 92 and the respective edges of the tile unit 60 is greater than the spacing between the on tile guide lines 80, 82, 84 and 86 and the respective tile unit edges by a predetermined amount corresponding to the desired spacing between to be provided between tile units. The spacing usually amounts to about one eighth of an inch.

In addition, the package 61 of FIG. 14 can include a pair of tab units 96 and 98 having a horizontal and vertical orientation respectively. The tab units 96 and 98 are of the type previously described with regard to FIG. 13 and are to be used as an added aid in helping to initially orient the package relative to a mounting surface.

Figure 16:
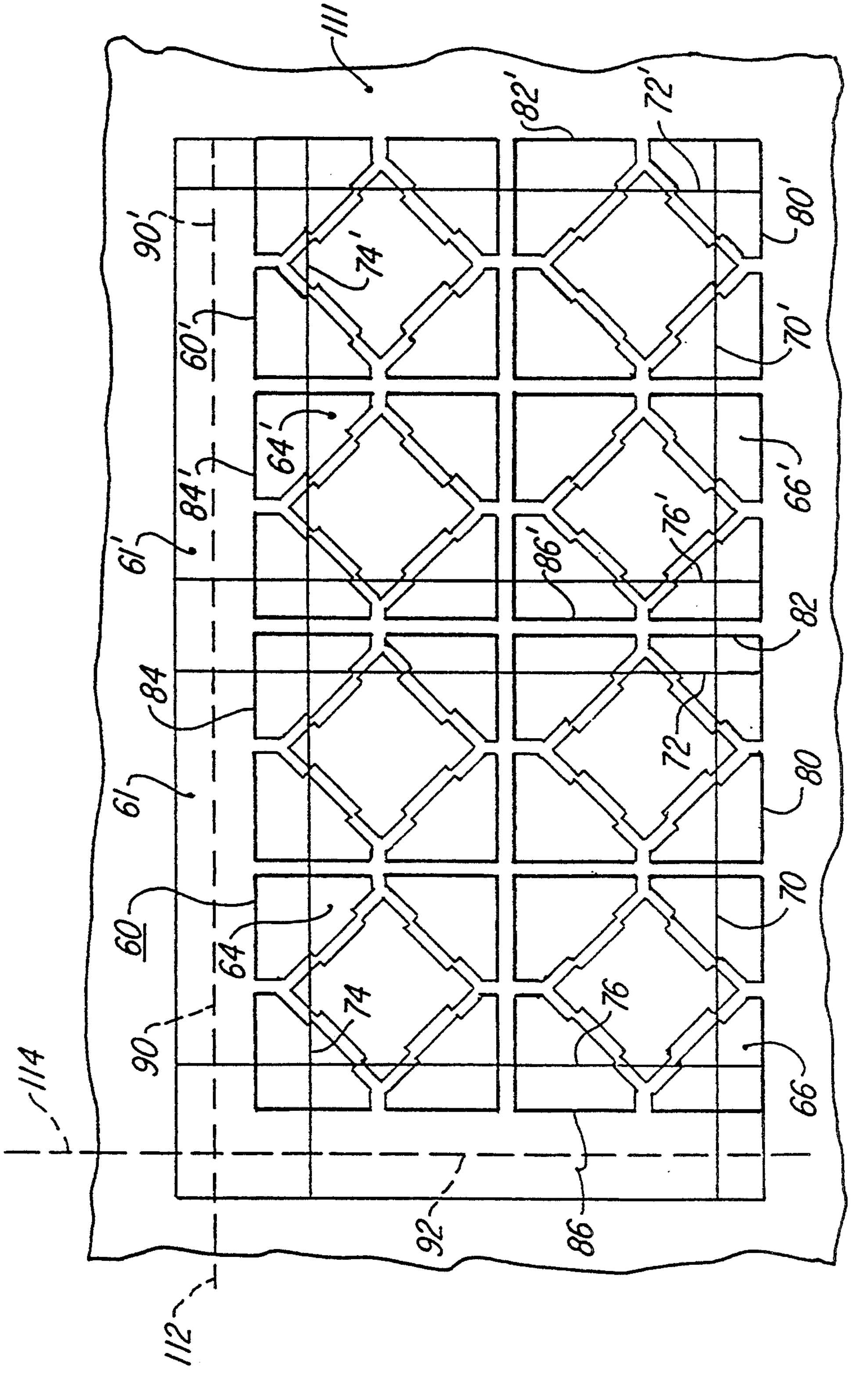
FIG. 16 illustrates a plurality of the square tile designs of FIG. 14 mounted adjacent to each other to illustrate the use of the guides.

Although the package 61 for tile unit 60 is described with four on guide lines 70–76 and two off guide lines 90 and 92, the packaging arrangement can be alternatively produced with two additional package extensions 100 and 102 (shown in phantom) with corresponding off guide lines 108 and 110 or with one additional extension portion on one additional off guide line depending upon the final desired configuration and mounting techniques to be used as described with regards to FIG. 16. If the two additional extensions 100 and 102 are not being used, if needed the package 61 can be reinforced by the use of pieces of tape 104 and 106 to help maintain the package 61 in place.

If the tile pieces 64 of a prior art tile unit 60 are secured to the screening base 62, the package 61 need not cover the entire tile unit 60, but may only extend along a portion thereof as illustrated in FIG. 15. For purposes of simplifying the explanation, the same items in FIGS. 14 and 15 have the same reference numbers. In FIG. 15 the top sheet and the bottom sheet of the package 61 are formed of two strips 101 and 103 of the package of FIG. 4 that extend across a portion of the tile unit 60 and beyond the tile unit 60. The package includes the on guide lines 74 and 76 and the off guide lines 90 and 92. The on guide lines 70 and 72 extend over the face of the tile unit 60 and partially over the two strips 101 and 103. As in the case of FIG. 14, pieces of tape 113 and 115 can be used to help reinforce the package 61. Although the package of FIG. 15 includes two packaging strips 101 and 103, it is to be understood that the packaging arrangement could include three or four such packaging strips to cover three or all four edges and correspond to the package of FIG. 14, with the packaging strips portions 100 and 102, covering all or less than the entire tile unit.

When initially mounting the tile unit 60 with the packaging arrangement of the invention, the tile unit can be aligned to the horizontal and vertical reference lines 112 and 114 of FIG. 14 relative to the edges 84 and 86 respectively, or alternatively to the off guide lines 90 and 92. The tile unit 60 can be mounted vertically with the tab unit 98 or horizontally with the tab unit 96. Assume for purpose of illustration, horizontal mounting is selected. The tab unit 96 is removed and the corresponding portion of the sheet 61 is urged against a surface so that the adhesive layer exposed by the tab unit 96 premounts the package in the general location. The portion of the back sheet adjacent to the tab unit 96 is peeled back so that the front sheet 66 with the off guide 90 or the edge 84 are aligned with the reference line. At this time, the package is pivoted about the edge 84, the remainder of the back sheet removed, and mounting adhesive applied to the back of the tile pieces 64. The package is then pivoted back so that the backs of the tile pieces 64 engage the surface with the adhesive in between, and the tile unit 60 is temporarily held in place by the adhesive layer of the front sheet 66 until the mounting adhesive hardens. If only a single tile unit to be mounted, the front sheet 66 can be removed once the mounting adhesive hardens. On the other hand if additional tile units are to be mounted adjacent to tile unit 60 as in FIG. 16, the front sheet is maintained in place until the other tile units are mounted.

For purposes of simplifying the explanation of mounting such tile units as illustrated in FIG. 16, it shall be assumed that the tile unit on the left was the tile unit of FIG. 14 previously mounted on a surface 111 and the tile unit on the right is to be subsequently mounted adjacent thereto. For the further purpose of simplifying the explanation, the tile unit on the left shall also have the same reference numbers as that of FIG. 14, while the tile unit on the right shall have the same reference numbers, however with an added prime designation (′).

The mounting of the tile unit 60′ shall be described as being mounted relative to side 82 of tile unit 60, (vertical mounting) however, it should be understood that the mounting could take place horizontally in a similar manner with regard to edge 80 or 84. Also, for further simplifying the explanation, tabs 96 and 98 and the extension portions 100 and 102 are not being used. Initially the portion of the back sheet of the package for tile unit 60′ to the left of the edge 86′ is peeled back to at least beyond the off guide 92′. the package 61′ is now positioned so that the off guide 92′ is directly over and parallel to the on guide 72 and the off guide 90′ is aligned in a straight line with the off guide 90. The exposed adhesive layer on the top sheet 66′ is now urged against the exterior side of the top sheet 66 to temporarily maintain the tile unit 60′ in the proper orientation relative to tile unit 60. The package arrangement including the tile unit 60′ is now pivoted about the tile edge 86 and the remainder of the back sheet is removed. Mounting adhesive is now placed on the back side of the tile pieces 64′ of the tile unit 60′ (on the screening of the tile unit of FIG. 14)and the tile unit 60′ is thereafter pivoted back into place. The free portion of the adhesive layer on the sheet 66′, is urged against the surface 111 and the top sheet 66′ temporally maintains the tile unit 60′ in place while the mounting adhesive hardens. The process is repeated with regard to other tile units to be mounted adjacent to the tile units 60 and 60′, horizontally and vertically, until all the tile units are in place. After the mounting adhesive hardens on the tile units so mounted, all the top sheets are removed and thereafter grout is applied to the tile units to fill the inter-tile spacing in the conventional manner.

If the packaging arrangement including the tile unit that was previously mounted also includes the package extension portion 100 and 102 of FIG. 14, depending upon the edge to which the next tile unit is to be mounted, the corresponding extended portion can be cut away along the edge of the tile unit so that the procedure can continue as described above with regard to FIG. 16. The tape pieces 104 and 106 of FIG. 14 can be removed at the appropriate time during the mounting process.

Figure 17:
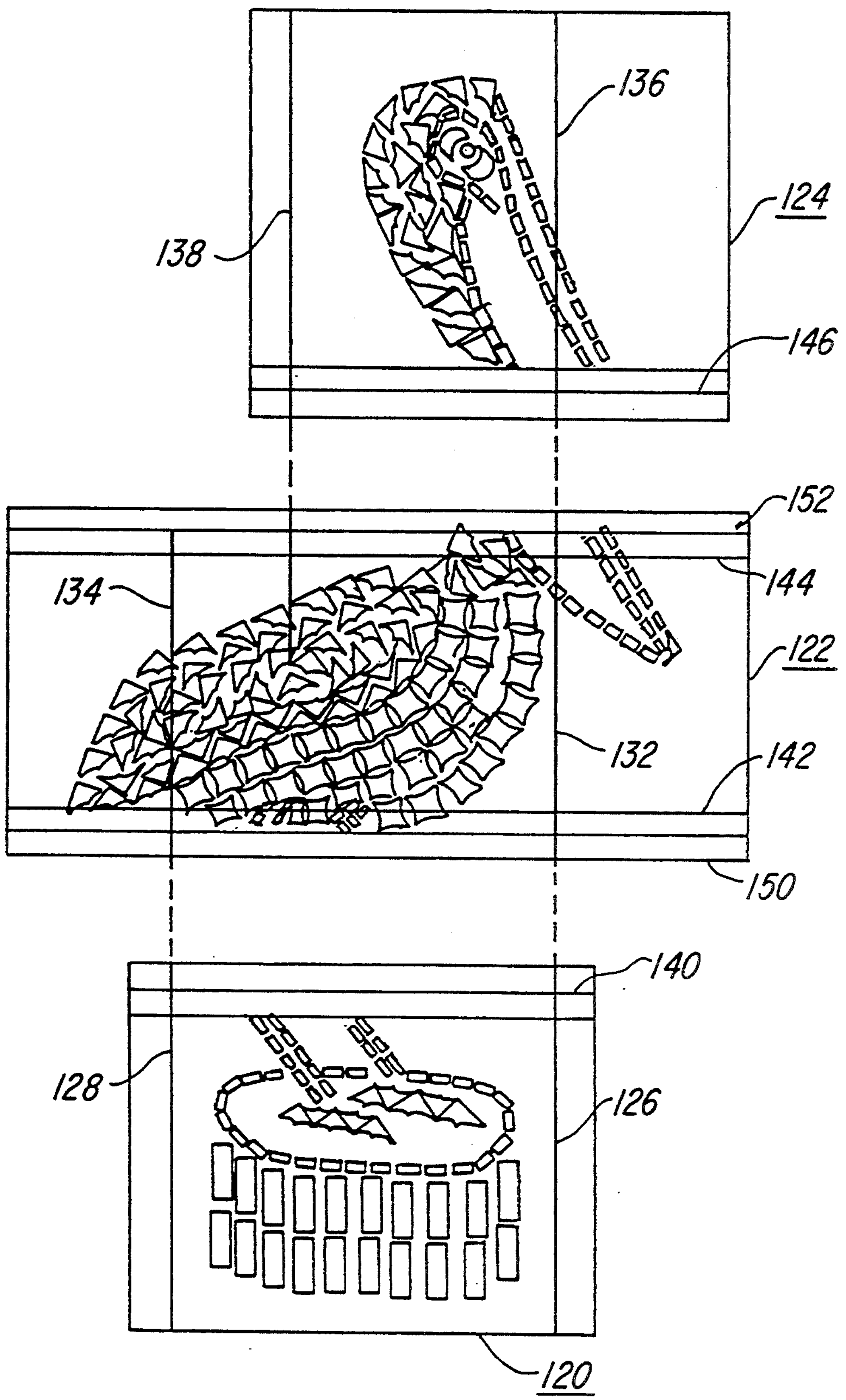
FIG. 17 illustrates a tile design for a pelican to be formed from three separate tile design portions captured by three separate packages.

If a tile design is to be rather large, such as for example three or four feet, the size of such tile design may be difficult to handle in one piece. Hence the packaging arrangement of the invention can be divided into a plurality of separate portions as illustrated in FIG. 17. The mosaic design includes a bottom portion 120, a middle portion 122 and a top portion 124, each portion being composed of loose tile pieces captured by a packaging arrangement composed of two sheets of plastic in a manner as described with regard to FIG. 1–8. The bottom, middle and top portions 120, 122 and 124 each include parallel matching vertical guide lines 126 and 128, 132 and 134, 136 and 138, respectively, and also the parallel horizontal guide lines 140,142 and 144 and 146, respectively.

Figure 18:
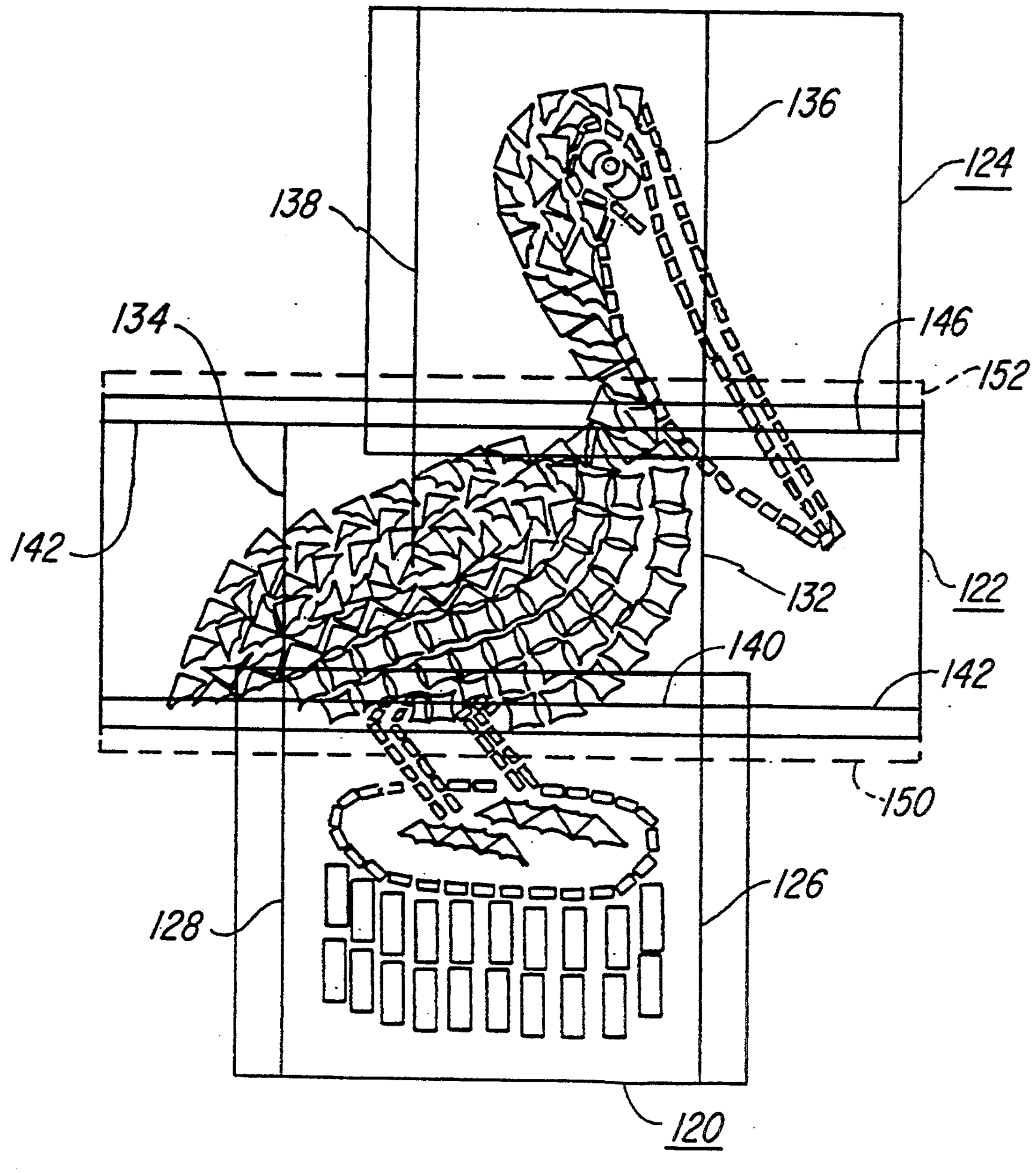
FIG. 18 illustrates the manner in which the three separate tile design portions of FIG. 17 are mounted with the use of guides to form the composite pelican design.

The tile design of FIG. 17 can be assembled and mounted to create the composite pelican design as illustrated in FIG. 18. The middle portion 122 can be first mounted on a substrate using selected ones of the guide lines 132, 134, 142 and 144 to provide proper orientation with reference lines in a manner as described above with regard to FIGS. 9–12. Thereafter, the portions 150 and 152 of the top sheet of the middle package 122

(illustrated in phantom on FIG. 18) are cut away so that the top and bottom edges of the top and bottom portions can be positioned adjacent to the edges of the middle portion. The bottom portion 120 can then be subsequently mounted adjacent the bottom side of the middle portion 122 by first stripping back part of the back sheet of the bottom portion so as to expose the horizontal guide 140. The horizontal guide 140 is then aligned with guide 142 and the vertical guides 126 and 128 are lined with the guides 132 and 134, respectively. The exposed adhesive layer on the top sheet of the bottom portion 120 is urged against the top sheet of the middle portion 122 to maintain the bottom portion temporarily in place. The bottom portion 120 is thereafter pivoted about the adhering portion of the top sheet, and the rest of the back sheet of the bottom portion is removed and mounting adhesive applied to the back of the tile pieces. The bottom portion is then pivoted back down in place and maintained temporarily in place by the adhesive layer of the top sheet. The top portion 124 is thereafter mounted adjacent to the top edge of the middle portion 122 using the horizontal guide 146 aligned with horizontal guide 144 and the vertical guides 136 and 138 aligned with the vertical guides 132 and 134 and cemented in place in a manner as mentioned above with regard to the bottom portion 120. Once the mounting adhesive hardens, all the top sheets of all three portions are removed and the pelican design will remain mounted with the proper orientation between the middle and top and bottom portions.

Although the above mentioned packaging arrangements and processes have been described in conjunction with a two dimensional tile design, it is to be understood that the packaging arrangements and the process of the invention can also apply to three dimensional designs. Further, while the three dimensional design may be composed of opaque tile pieces, it will have particular application to transparent tile pieces, such as, plastic and glass, so that these various colors can blend in creating the overall design. As in the case of the two dimensional design, the three dimensional designs of the prior art are hand created, requiring a considerable amount of artistic talent and time and expense to create each individual unit. Once the first three dimensional unit of the prior art is created, further reproductions were made by hand in the same manner. Such three dimensional designs, when made of multicolored transparent or translucent pieces, may be mounted in several layers on a transparent or translucent substrate. With such an arrangement, lighting can be directed through the substrate and the tile pieces, to allow the colors to blend and provide an added overall artistic effect.

According, to the invention, the three dimension design can be created by a series of individual layers, each layer being produced and packaged individually with the top sheet only or with both sheets in accordance with the process described above with regard to FIG. 1–10. The various packages can in addition include the guide means, similar to the vertical and horizontal guides as described above. The various layers of the three dimensional design can then be mounted on top of the other in sequence. After each layer is mounted and the adhesive is hardened, the front sheet is removed before the subsequent layer can be mounted.

A master pattern for the three dimension design first needs to be created in a series of layers that provide the desired effect. This can be accomplished with the master pattern in accordance with the packaging arrangement of the invention by having both the sheets of each layer being transparent so that the layers can be placed one over the other in a trial arrangement to determine if the desired effect was achieved. If needed the packaging arrangement of the individual layers of the master pattern can be reopened and the tile pieces realigned or changed in color to provide the desired effect. Further if desired, in creating the multilayer three dimension design the nonadhesive sheet could be excluded from this process and each layer adhered only to the adhesive sheet of the prior layer to provide a more permanent structure that can be more readily handled, or can function as a second step in the creating of the design once the initial work was satisfactory. In creating the three dimensional tile design, the tile pieces can be aligned one over the other or can be offset with pieces overlapping in at least part, so that each tile piece in each layer can be cemented, at least in part, to a piece of tile in the prior layer. If not, then the process becomes somewhat more complicated by cementing pieces of tile to other pieces of tile to form a plural layer in a single packaging arrangement and thereafter mounted with that added layer to fit within the gap in the prior layer. Once the various layers of tile pieces are so designed, they can serve as master patterns for the mass production of further such three dimensional designs as described below.

Figure 19:
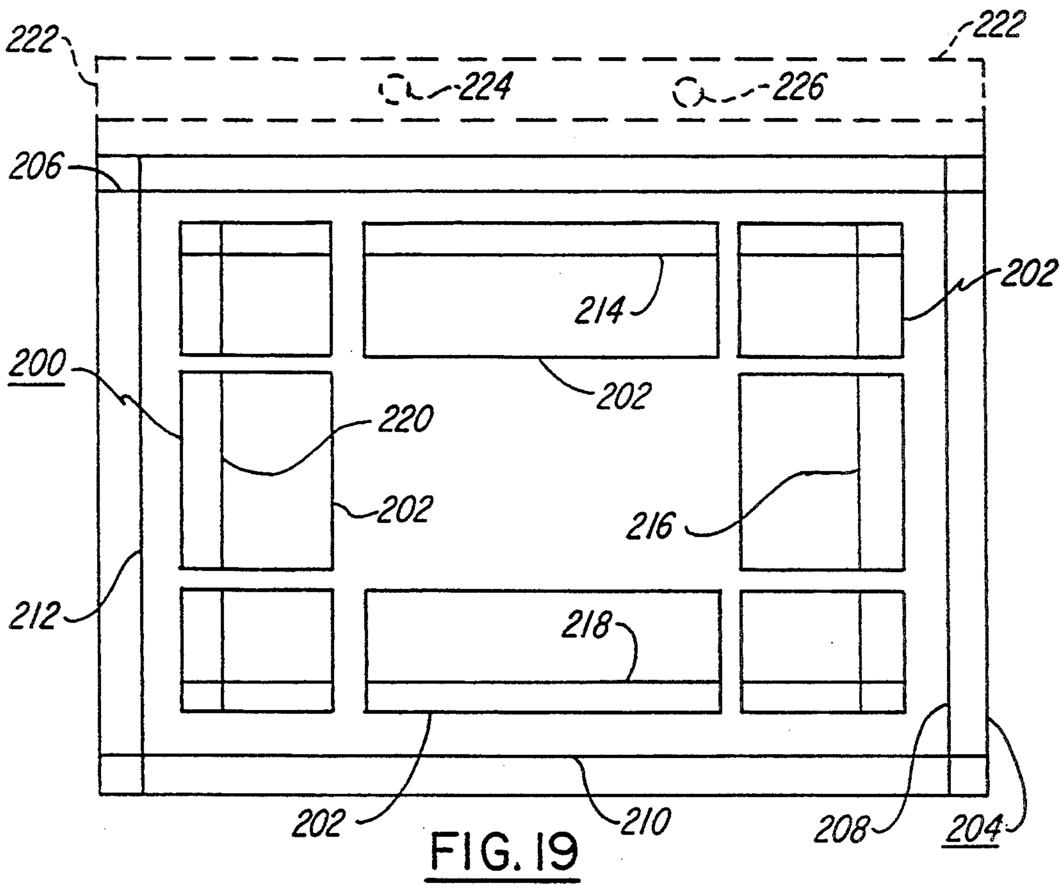
FIGS. 19, 20 and 21 illustrate three separate bottom, middle and top tile designs, respectively, each included in three separate packaging arrangements, for use in producing a three dimensional tile design.
Figure 20:
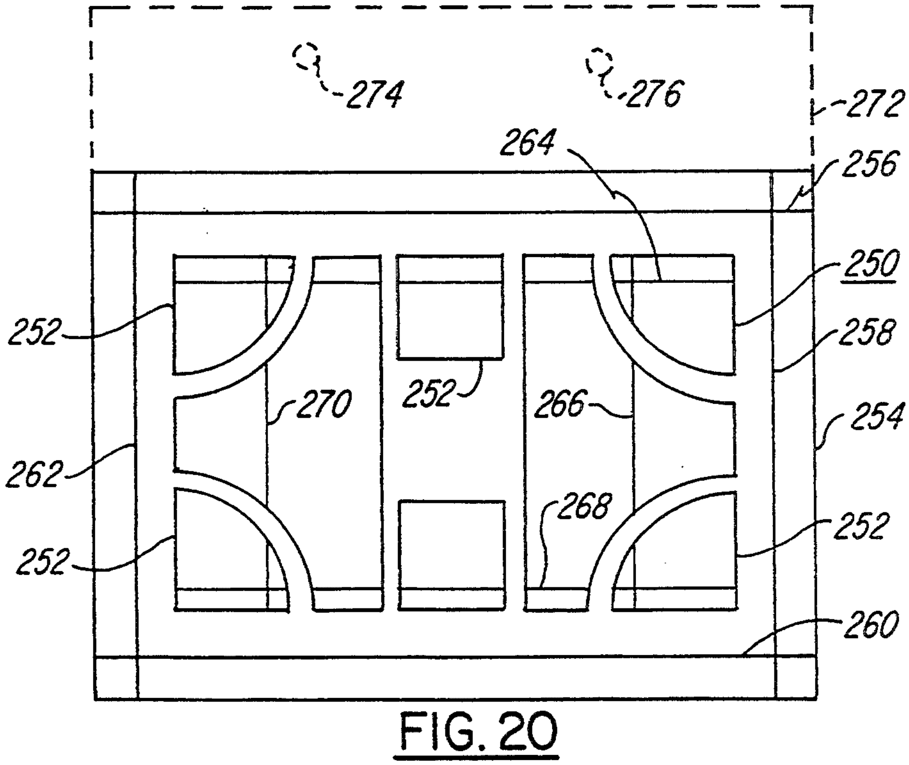
Figure 21:
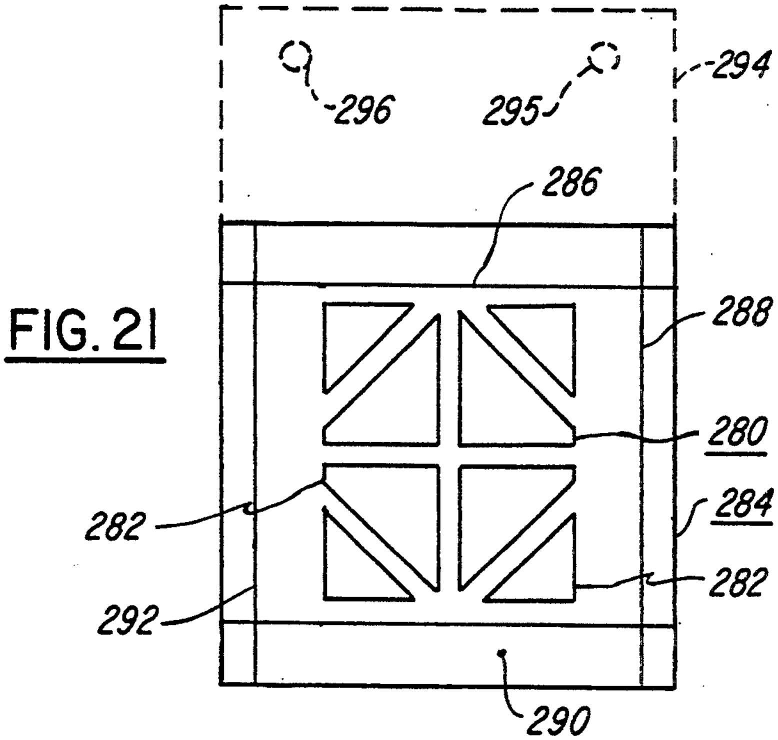

An example of a three dimensional tile design is illustrated as being created from the three separate tile designs 200, 250 and 280 of FIGS. 19, 20 and 21. The three dimensional design will be explained with the tile design 200 of FIG. 19 designated as the bottom layer, upon which the tile design 250 of FIG. 20 is mounted as the middle design, and with the tile design 280 of FIG. 21 is mounted as the top design on top the middle tile design. However, it is to be understood that the process could be reversed with the top tile design 280 as the bottom, and the bottom tile design 200 as the top, and with the middle tile design 250 in between.

The packaging arrangement of the bottom tile design 200 is illustrated including eight separate generally rectangular shaped pieces of tile 202 that are captured and held in place by a package 204 in a manner as described with regard to FIGS. 1–8. In addition, the package 204 includes four "off" guide lines 206–212 on the portion of the package 204 that extends beyond the tile design. Further there are four readily removable "on" guide lines 214–220 that are formed on the front faces of the pieces of tile 206 by an erasable marker, etc. The package 204 may in addition include an extended portion 222 illustrated in phantom. The extended portion 222 includes a pair of guide holes 224 and 226 that have a preset separation from the top edge and side edges of the tile design 200 and therefor a predetermined separation from the guide lines 214–220. The guide holes 224 and 226 can be used to mount the tile design 200 instead of the guide lines and thereby eliminate the guide lines or alternately to supplement the guide lines as described below.

The packaging arrangement for the middle tile design 250 of FIG. 20 includes eight separate tile pieces 252 of various shapes held in place by the package 254. The middle tile design includes the off guide lines 256–262 that correspond to the bottom tile design on guide lines 214–220, and also includes erasable four on guide lines 264–270 on the front faces of the tile pieces 252. The middle tile design can also include an extended portion 272 and the guide holes 274 and 276 illustrated in phantom. The guide holes 274 and 276 have a preset distance relative to the guide lines 264–270 corresponding to the preset separation of holes 224 and 226 and guide lines 214–220 of FIG. 19.

The packaging arrangement of the top tile design 280 of FIG. 21 includes eight separate tile pieces 282 of various shapes held in place by the package 284. The top tile design includes the "off" guide lines 286–292 that correspond to the middle tile design "on" guide lines 264–270. The top tile design 280 can also include the extended portion 294 and the guide holes 296 and 298 as illustrated in phantom. The guide holes 296 and 298 have a preset distance relative to the off guide lines 286–292 corresponding to the preset separation of the holes 274 and 276 and the on guide lines 264–270 of FIG. 20.

Figure 22:
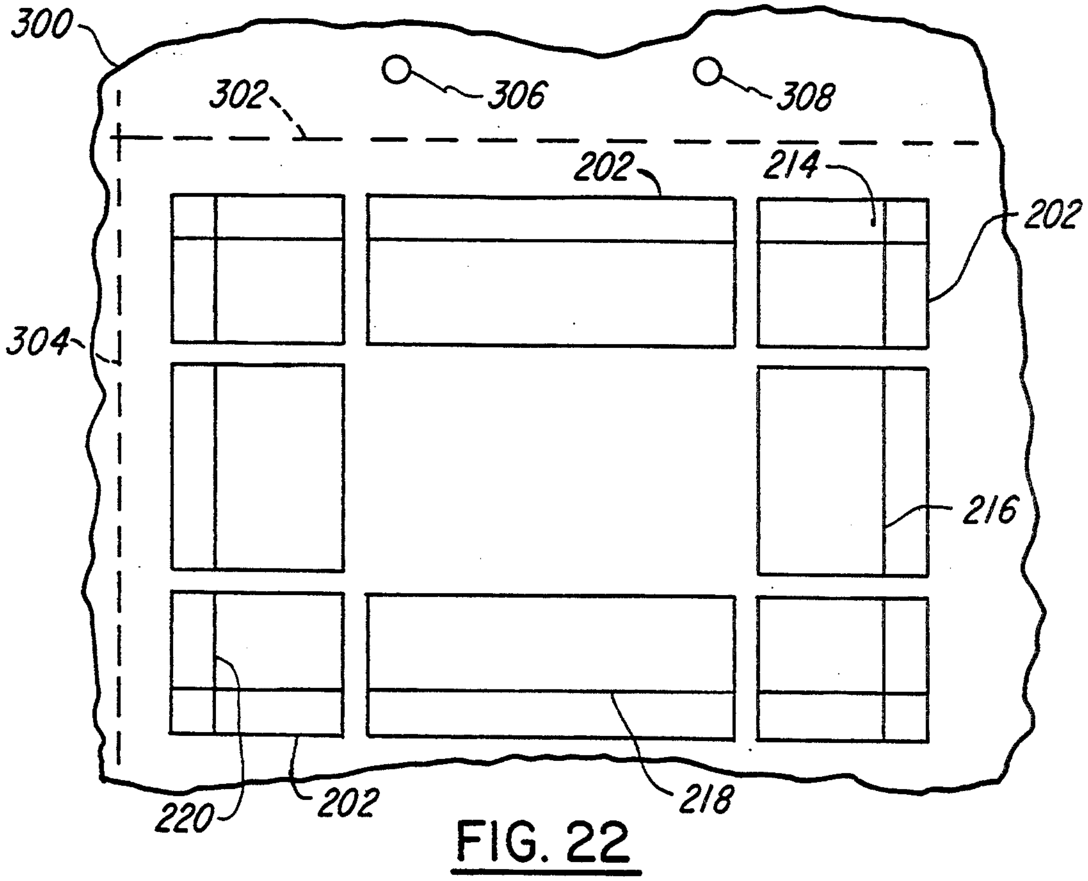
FIG. 22 illustrates the bottom tile design of FIG. 19 mounted to a substrate.

The bottom tile design 200 is illustrated in FIG. 22 as being mounted to a substrate 300 relative to the horizontal and vertical reference lines 302 and 304 with the use of the off guide lines 206 and 212 in a manner as described with regards to FIGS. 9–12, and with the package 204 removed. In addition, the tile design 200 could be mounted in place by the use of a pair of guide pins 306 and 308 that fit with the guide holes 224 and 226 as the separate mounting reference, or as an additional reference to supplement the alignment of the "off" guide lines 206–212

Figure 23:
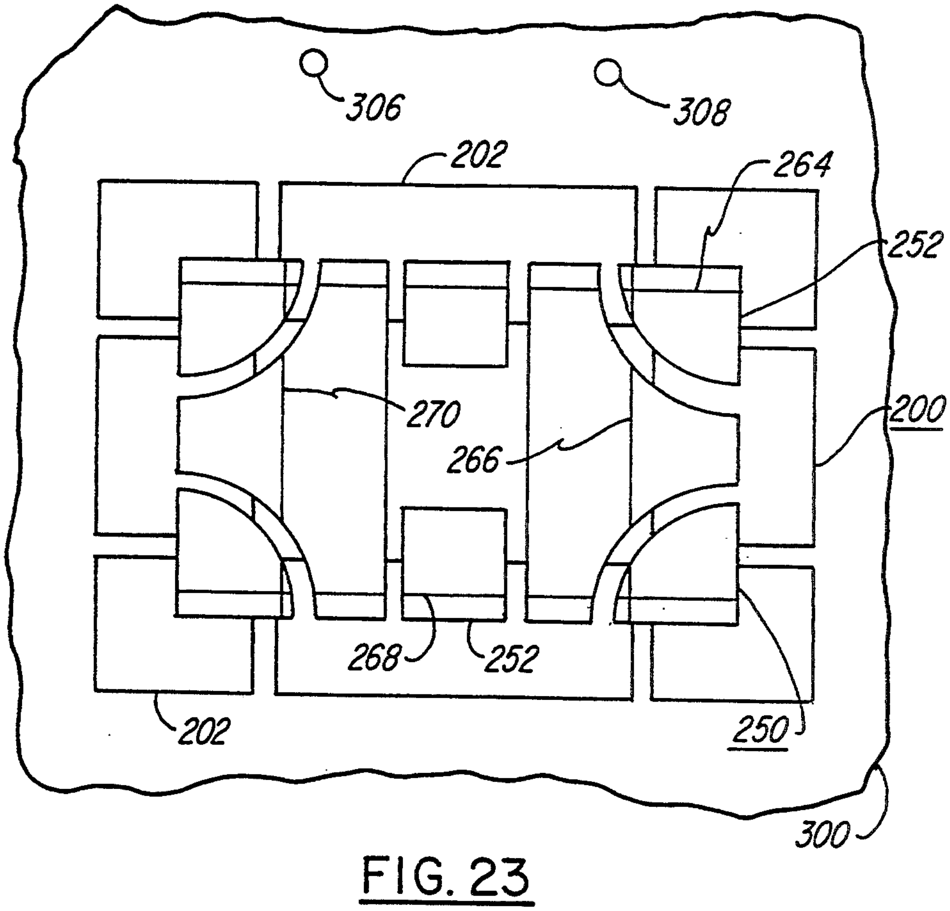
FIG. 23 illustrates the middle tile design of FIG. 20 mounted on the bottom tile design.
Figure 24:
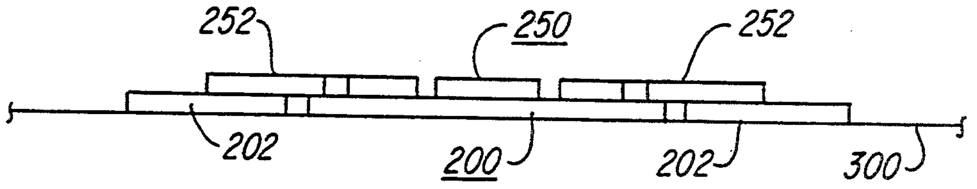
FIG. 24 is a side view of the two layer three dimensional tile design of FIG. 23.

The middle tile design 250 is now mounted on top the bottom tile design 200 as illustrated in FIGS. 23 and 24 with the off guide lines 256–262 of the middle tile design package 254 being aligned with the on guide lines 214–220 of the bottom tile design 200, in a manner as described with regards to FIGS. 9–12 or with the guide holes 274 and 276 on the extended portion 272 with the use of the pins 306 and 308 alone, or to supplement the guide lines. The top sheet of the package 254 is removed after the mounting adhesive is hardened and the "on" guide lines 214–220 on the bottom tile design 200, where exposed can be removed or erased. It should be noted that in this process each of the tile pieces 252 of the middle tile design extend over, at least in part, at least one tile piece 202 of the bottom tile design 200 to provide the means for securing the middle tile pieces to the bottom tile pieces.

Figure 25:
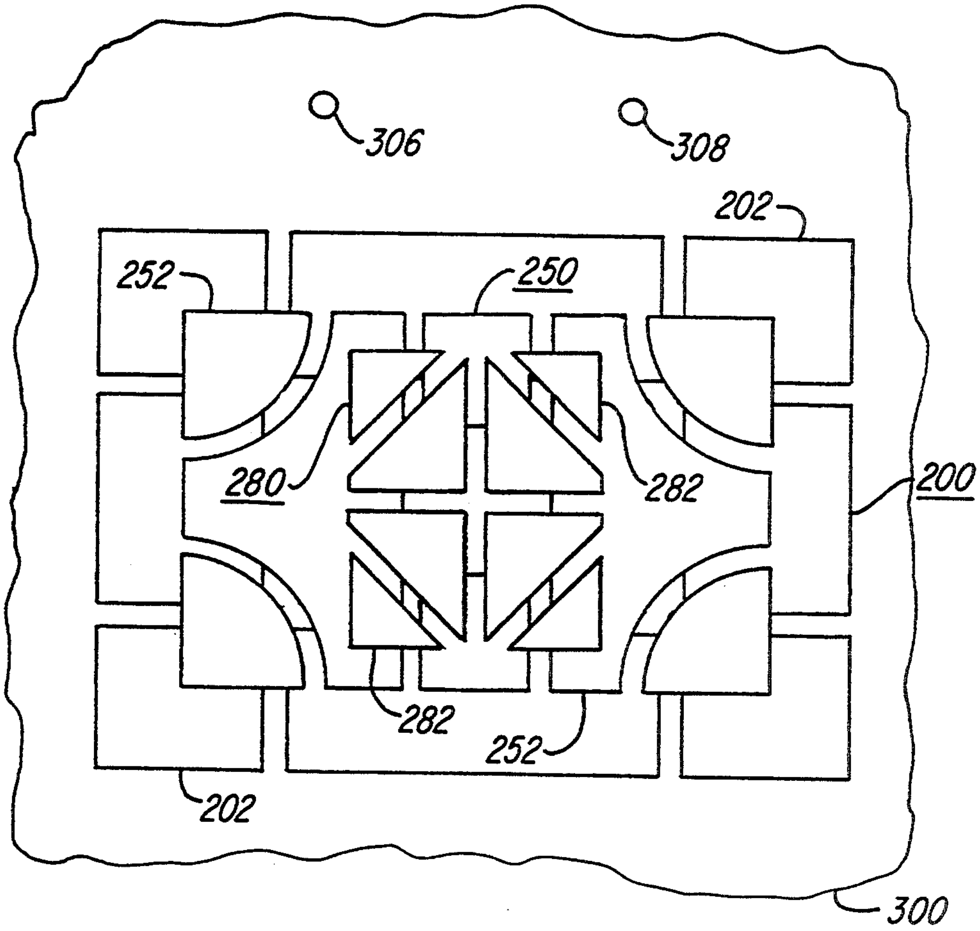
FIG. 25 illustrates the top tile design of FIG. 21 mounted on the middle tile design, which in turn is mounted on the bottom tile design.
Figure 26:
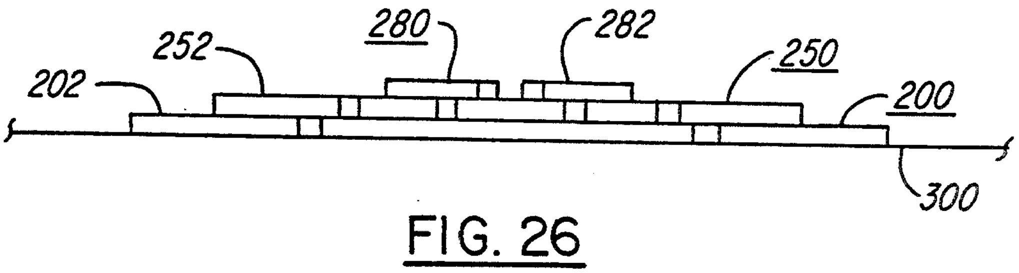
FIG. 26 is a side view of the three layer three dimensional tile design of FIG. 25.

The top tile design 280 is now mounted on top of the middle tile design 250 as illustrated in FIGS. 25 and 26 with the off guides 286–292 of the top design being aligned with the "on" guide lines 264–270 of the middle tile design 250, in a manner as described with regards to FIGS. 9–12, or with the guide holes 296 and 298 on the extended portion 294 with the use of the pins 306 and 308 alone or to supplement the guide lines. The top sheet of package 284 is removed after the adhesive is hardened and the exposed portions of the guide lines 264–270 are removed or erased. It should be noted that in this process each of the tile pieces 282 of the top design extend over, at least in part, at least one tile piece 252 of the middle tile design 250 to provide the means for securing the top tile pieces to the middle tile pieces.

As can be seen by the above description, a packaging arrangement is provided with the objective of capturing various items that are to be subsequently mounted, such as mosaic design and the like, between a pair of flexible substrates that also functions as mounting aids and wherein one substrate is transparent so that the captured item is readily visible. As such, the packaged item can be mass produced and placed on display at various outlets in a manner that the purchaser can actually see the item being purchase, and further so that a partly mounting the item can view the same in position prior to final mounting.

The packaging arrangement can be entirely enclosed, in that the package completely surrounds the item and extends beyond the item in a manner such that the adhesive layer on the front substrate and the item are covered by the back substrate. This arrangement assures that the item is securely captured and that substantially none of the adhesive layer is exposed to dust etc., so as to degrade its adhesive abilities. If the item is a solitary item, the package need not encapsulate the entire item, but needs to extend beyond the item with the back substrate covering the extended portion of the otherwise exposed adhesive layer. The packaging arrangement is a self contained unit in that it can be roughly handled, rolled, and shipped with a minimum amount of packaging and still maintain its desired configuration.

The fact that the front sheet extends beyond the captive item, the packaging arrangement is particularly adaptable to be used with the extended portions to function as an aid in temporarily mounting the packaged item in place until the mounting adhesive hardens. Further the extended portions of the packaging arrangement also provide a means to include mounting guides to aid in mounting the item relative to some references, or adjacent to, or to create part of, a larger or more complex tile design.

What is claimed is:

1. A packaged mosaic design comprising:

a plurality of separate elements arranged in a form of a mosaic design, a first thin plastic sheet, larger in size than said mosaic design, having one side that includes a readily detachable adhesive layer that extends over at least a portion of the one side of said sheet and that is larger than the size of the mosaic design and that a portion of said layer adheres to one side of said mosaic design, and a second thin plastic sheet, larger in size than said mosaic design that adheres to a portion of said adhesive layer not adhering to the mosaic design, whereby said mosaic design is captured between the two sheets.

2. A packaged mosaic design as set forth in claim 1 wherein:

said adhesive layer is adaptable to be detached from said mosaic design without leaving any readily visible residue on the mosaic design.

3. A packaged mosaic design as set forth in claim 2 wherein:

said adhesive layer forms a stronger bond with said first plastic sheet and a weaker bond with said mosaic design and said second plastic sheet, and said second plastic sheet and said mosaic design are adapted to be detached from said adhesive layer without destroying the bond between the adhesive layer and the first plastic sheet.

4. A package mosaic design as set forth in claim 1 wherein:

the first plastic sheet is transparent so that one side of the mosaic design is visible therethrough.

5. A packaged mosaic design as set forth in claim 4 wherein:

said plurality of elements are not connected to each other and are held in place by the adhesive layer of said first plastic sheet.

6. A packaged mosaic design as set forth in claim 5 wherein:

at least one mounting guide is provided on one of said sheets having a preset location relative to said mosaic design.

7. A packaged mosaic design as set forth in claim 6 wherein:

said second thin plastic sheet is of a smaller size than said first plastic sheet wherein at least a portion of the adhesive layer is not covered by said second plastic sheet and at least one additional sheet portion covering said otherwise uncovered portion of the adhesive layer forming a separate readily detachable tab portion.

8. A packaging arrangement for an item intended to subsequently be mounted to a surface comprising:

a first thin flexible substrate larger in size than said item, one side of which includes a readily detachable adhesive layer, said adhesive layer being larger in size than said item and adhering to at least a portion of the item intended to be visible after mounting to the surface, and a second thin flexible substrate secured to a portion of said adhesive layer not adhering to the item so that said item is held in place between said first and second substrates, wherein said second substrate is readily detachable from said adhesive layer and wherein said first substrate is thereafter adapted to engage said mounting surface with a portion of the adhesive layer that is not adhering to the item for temporarily maintaining the item in place on said surface.

9. A packaging arrangement as set forth in claim 8 wherein:

said adhesive layer is adaptable to be detached from the item without leaving any readily visible residue on the item.

10. A packaging arrangement as set forth in claim 9 wherein said adhesive layer forms a stronger bond with said first flexible substrate and a weaker bond with said item and said second flexible substrate, and and wherein said second substrate and said item are adapted to be detached from said adhesive layer without destroying the bond between the adhesive layer and the first substrate.

11. A packaging arrangement as set forth in claim 8 wherein:

at least one mounting guide is provided on one of said sheets having a preset location relative to said item.

12. A packaging arrangement as set forth in claim 11 wherein:

said second substrate is of a smaller size than said first substrate wherein at least a portion of the adhesive layer is not covered by said second substrate and at least one additional substrate portion covering said otherwise uncovered portion of the adhesive layer forming a separate readily detachable tab portion.

13. A packaging arrangement as set forth in claim 12:

wherein said item includes a plurality of separate unconnected elements having a predetermined design positional relationship therebetween, and wherein said adhesive layer of said first substrate maintains the predetermined positional relationship between said separate elements.

14. A packaging element as defined in claim 13 wherein:

said separate elements are tile pieces arranged in a design relationship to form a mosaic design.

15. The combination comprising:

a tile unit adapted to be mounted on a surface adjacent to other tile units to form a tiled surface, a first thin flexible substrate, one side of which includes an adhesive layer, said substrate covering at least a portion of said tile unit on the front side thereof, and with a portion of said adhesive layer extending beyond said tile unit, a second thin flexible substrate covering at least a portion of the back side of the tile unit and extending beyond the unit engaging a portion of the adhesive layer that also extends beyond said tile unit, a first guide line on said first flexible substrate extending along a portion of the tile unit, and a second guide line, extending along a portion of said first flexible substrate that extends beyond the unit, parallel to said first guide line and separated therefrom by a preset amount.

16. The combination as defined in claim 15 wherein:

said tile unit is formed with at least two straight edges and said first and second guide lines are parallel to separate ones of the straight edges of said tile unit.

17. The combination as defined in claim 16 wherein:

said tile unit comprises a plurality of tile pieces, the backs of which are secured to a separate flexible substrate.

18. The combination as defined in claim 16 wherein:

said tile unit comprises a plurality of unconnected tile pieces.

19. A packaging arrangement for tile units includes a plurality of tile pieces arranged in a rectangular shape comprising:

a first flexible sheet having a readily detachable adhesive layer on one side thereof with a portion of the adhesive layer adhering to at least a portion of the front face of a tile unit, said first sheet and adhesive layer thereon extending beyond the tile unit along at least one of the rectangular dimensions of the tile unit, a second flexible sheet abutting against at least a portion of the back side of the tile unit and extending beyond the tile unit along said at least said one of said rectangular dimensions as said first sheet and adhering to a portion of said first sheet extending beyond the tile unit, at least one linear on guide means located on said first sheet and extending over the tile unit adjacent to one of said rectangular dimensions of said tile unit and parallel thereto, and at least one linear off guide means, located on said first sheet on the portion that extends beyond said tile unit and parallel to said on tile guide means, wherein the spacing between said off guide means and said rectangular dimension of said tile unit exceeds the spacing between the on guide line and said rectangular dimension by an amount corresponding to a preset inter tile unit spacing.

20. A packaging arrangement as defined in claim 19 wherein said on guide means includes at least two guide means that are parallel to two different rectangular dimensions of said tile unit, and said off tile guide means including at least two tile guides that are parallel to said two different rectangular dimensions of said tile unit.

21. A packaging arrangement as defined in claim 19 wherein:

the two rectangular dimensions of said tile units are transverse to each other.

22. A packaging arrangement as defined in claim 21 wherein:

said on tile guides extend along the full length of the tile unit dimension to which they are parallel.

23. A packaging arrangement as defined in claim 22 wherein, said on guides means extends beyond the said tile unit over a portion of said first sheet that extends beyond the tile unit.

24. A packaging arrangement as defined in claim 23 wherein said tile units comprise a plurality of unconnected tile pieces.

25. A packaging arrangement as defined in claim 23 wherein said tile unit comprise a plurality of tile pieces with their back sides secured to a screen type carrier.

26. A packaging arrangement for producing a mosaic design comprising:

plural packages, each package including a pair of sheets with their sides overlying and abutting against each other, with one of said sheets including a readily detachable adhesive layer on the one side of said one sheet that is abutting against the other so that the two sheets are bound together by said adhesive layer, said adhesive layer having a stronger bond with said one sheet than with the other sheet, plural partial mosaic designs, each being composed of a plurality of separate pieces, separate ones of said partial mosaic designs being included in separate ones of the plural packages and are located between the two sheets, of the respective package, wherein each of the partial mosaic designs are smaller in dimensions than the two sheets so that the two sheets capture the corresponding partial mosaic design in between with the mosaic design pieces adhering to the sheet with the adhesive layer and with the pair of sheets adhering to each other, and said partial mosaic designs in said plural packages, when positioned relative to each other in a predetermined manner, are adapted to create the mosaic design.

27. A packaging arrangement as defined in claim 26 wherein:

said one sheet of each of said pairs of sheets is transparent, and each of said pair of sheets in each of said plural packages include a portion thereof that extends beyond the partial mosaic design that is captured between the sheets.

28. A packaging arrangement as defined in claim 27 wherein:

when of one of said plural packages is positioned adjacent to another package at least part of the extended portion of at least one of the sheets is adapted to extend over said adjacent package.

29. A packaging arrangement as defined in claim 28 wherein:

said extended portion includes guide means for aligning such packages relative to each other.

30. A packaging arrangement as defined in claim 29 wherein:

said guide means includes at least one line.

31. A packaging arrangement as defined in claim 30 wherein:

said guide means includes holes formed in the extended portion.

32. A packaging arrangement as defined in claim 28 wherein:

said plural packages are adapted to be positioned side by side adjacent each other with edges of the partial mosaic designs located adjacent to, each other.

33. A packaging arrangement as defined in claim 28 wherein:

said plural packages are adapted to be positioned one on top the other.

34. A packaging arrangement for producing a composite mosaic design comprising:

at least two partial packaging arrangements, each of said partial packaging arrangements includes a pair of flexible substrates for capturing a separate partial mosaic design therebetween, wherein at least one of the flexible substrates in each of said partial packaging arrangements includes a readily detachable adhesive layer on one side that abuts against and adheres to the other substrate, a separate partial mosaic design in each of said partial packaging arrangements adhering to the adhesive layer, the dimensions of each of said partial mosaic designs being less than the dimensions of its respective partial packaging arrangement wherein the partial packaging arrangements captures its partial mosaic design between the two substrates, and said partial mosaic designs being so configured so as to be adapted to be mounted adjacent each other to create a composite mosaic design.

35. A packaging arrangement as set forth in claim 34 wherein:

said partial mosaic designs are composed of a plurality of separate pieces, and the adhesive layer maintains the loose pieces in the desired intra positional design relationship.

36. A packaging arrangement as set forth in claim 35 wherein:

the flexible substrate including the adhesive layer is transparent, and the adhesive layer adheres to the front faces of the loose pieces of the mosaic design.

37. A packaging arrangement as set forth in claim 36 wherein:

guide means are provided on said partial packaging arrangements adapted to serve as an aid in mounting said partial mosaic designs relative to each other to produce the composite mosaic design.

38. A packaging arrangement as set forth in claim 35 wherein:

said partial mosaic designs are adapted to be mounted side by side to create the composite mosaic design.

39. A package arrangement as set forth in claim 35 wherein:

said partial mosaic designs are adapted to be mounted on top the other to create a three dimensional composite mosaic design.

40. A mosaic design unit comprising:

a first substrate having a readily detachable adhesive layer on one side, a plurality of individual elements adhering to the first substrate and positioned adjacent to each other to form a mosaic design pattern that does not cover the entire substrate so as to leave at least a portion of the adhesive layer uncovered, and a second substrate positioned over the elements and at least a portion of the first substrate so as to adhere to the first substrate by the portion of the adhesive layer not covered by the mosaic design and captures the mosaic design unit between said two substrates.

* * * * *